United States Patent
Kanamori et al.

(10) Patent No.: US 12,367,874 B2
(45) Date of Patent: Jul. 22, 2025

(54) INFORMATION PROCESSING APPARATUS AND INFORMATION PROCESSING METHOD

(71) Applicant: SONY GROUP CORPORATION, Tokyo (JP)

(72) Inventors: Katsutoshi Kanamori, Tokyo (JP); Masato Nishio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 360 days.

(21) Appl. No.: 17/309,993

(22) PCT Filed: Dec. 11, 2019

(86) PCT No.: PCT/JP2019/048579
§ 371 (c)(1),
(2) Date: Jul. 8, 2021

(87) PCT Pub. No.: WO2020/153028
PCT Pub. Date: Jul. 30, 2020

(65) Prior Publication Data
US 2022/0076672 A1 Mar. 10, 2022

(30) Foreign Application Priority Data

Jan. 22, 2019 (JP) .................. 2019-008621

(51) Int. Cl.
*G10L 15/22* (2006.01)
*G10L 15/06* (2013.01)
*G10L 15/10* (2006.01)

(52) U.S. Cl.
CPC .............. *G10L 15/22* (2013.01); *G10L 15/06* (2013.01); *G10L 15/10* (2013.01)

(58) Field of Classification Search
CPC ......... G10L 15/22; G10L 15/06; G10L 15/10; G10L 15/26; G06F 40/186; G06F 40/247; G06F 40/30
See application file for complete search history.

(56) References Cited

U.S. PATENT DOCUMENTS

| | | | |
|---|---|---|---|
| 2006/0036433 A1* | 2/2006 | Davis ................... | G10L 13/027 704/223 |
| 2011/0161829 A1* | 6/2011 | Kristensen ............ | G06F 3/0482 715/739 |

(Continued)

FOREIGN PATENT DOCUMENTS

| | | |
|---|---|---|
| CN | 106055547 A | 10/2016 |
| CN | 106575503 A | 4/2017 |

(Continued)

OTHER PUBLICATIONS

International Search Report and Written Opinion of PCT Application No. PCT/JP2019/048579, issued on Feb. 25, 2020, 09 pages of ISRWO.

*Primary Examiner* — Daniel C Washburn
*Assistant Examiner* — Paul J. Mueller
(74) *Attorney, Agent, or Firm* — CHIP LAW GROUP

(57) ABSTRACT

Provided is an information processing apparatus which includes a control section that controls a conversation with a user according to a recognized situation. The control section acquires knowledge elements related to the recognized situation in terms of knowledge from knowledge sets, and determines contents of an utterance on the basis of the knowledge elements and an utterance template. Further, provided is an information processing method that includes controlling, by a processor, a conversation with a user according to a recognized situation. The controlling further includes acquiring knowledge elements related to the recognized situation in terms of knowledge from knowledge (Continued)

sets, and determining contents of an utterance on the basis of the knowledge elements and an utterance template.

17 Claims, 20 Drawing Sheets

(56) References Cited

U.S. PATENT DOCUMENTS

| | | | |
|---|---|---|---|
| 2013/0151555 A1* | 6/2013 | Miyano | H04N 5/76 |
| | | | 707/769 |
| 2016/0293162 A1 | 10/2016 | Takahashi et al. | |
| 2017/0270925 A1* | 9/2017 | Kennewick | G10L 15/04 |
| 2018/0342007 A1* | 11/2018 | Brannigan | G06Q 30/0643 |
| 2019/0236140 A1* | 8/2019 | Canim | G06F 40/30 |
| 2019/0384855 A1* | 12/2019 | Bhattacharya | G06F 16/3334 |

FOREIGN PATENT DOCUMENTS

| | | |
|---|---|---|
| JP | 2003-108376 A | 4/2003 |
| JP | 2003-280683 A | 10/2003 |
| JP | 2016-197227 A | 11/2016 |
| JP | 2017058318 A | 3/2017 |
| KR | 101677859 B1 | 11/2016 |
| WO | WO-2018142686 A1 | 8/2018 |
| WO | 2018/163646 A1 | 9/2018 |
| WO | WO-2019011356 A1 | 1/2019 |

* cited by examiner

F I G . 2
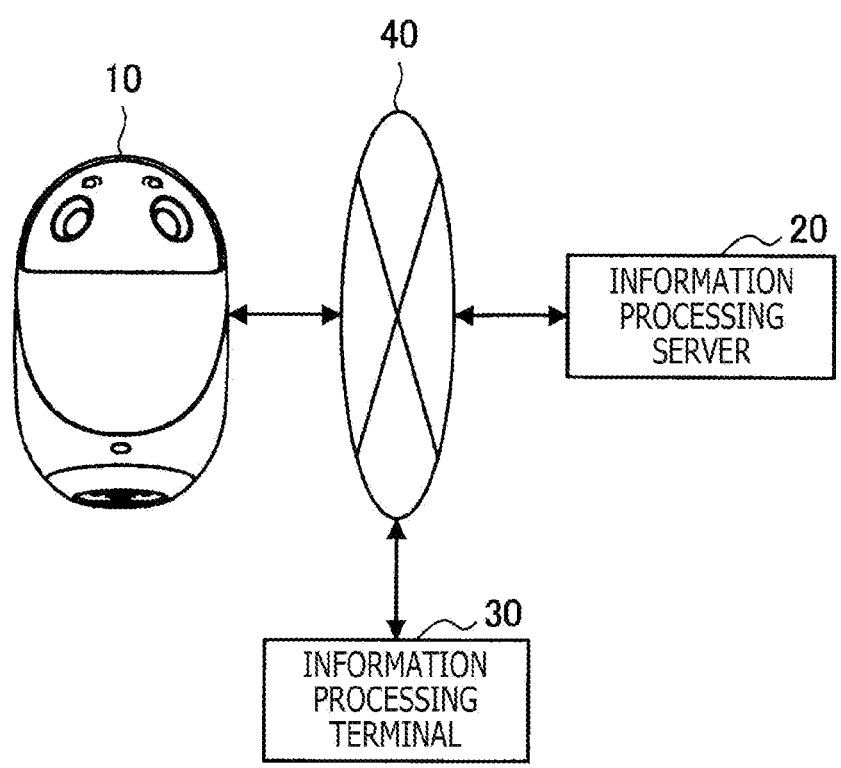

FIG.5
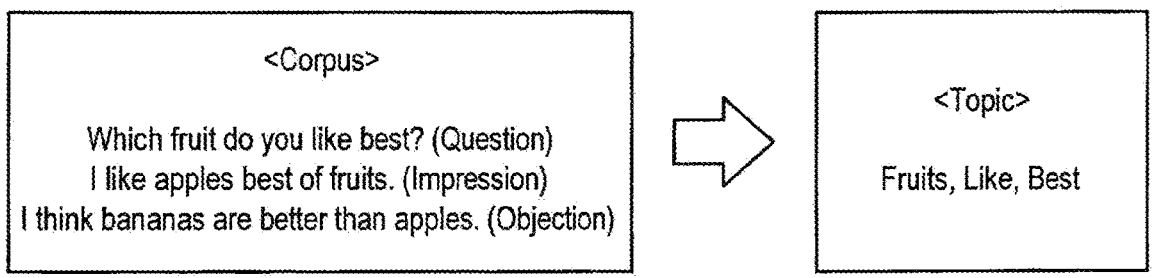
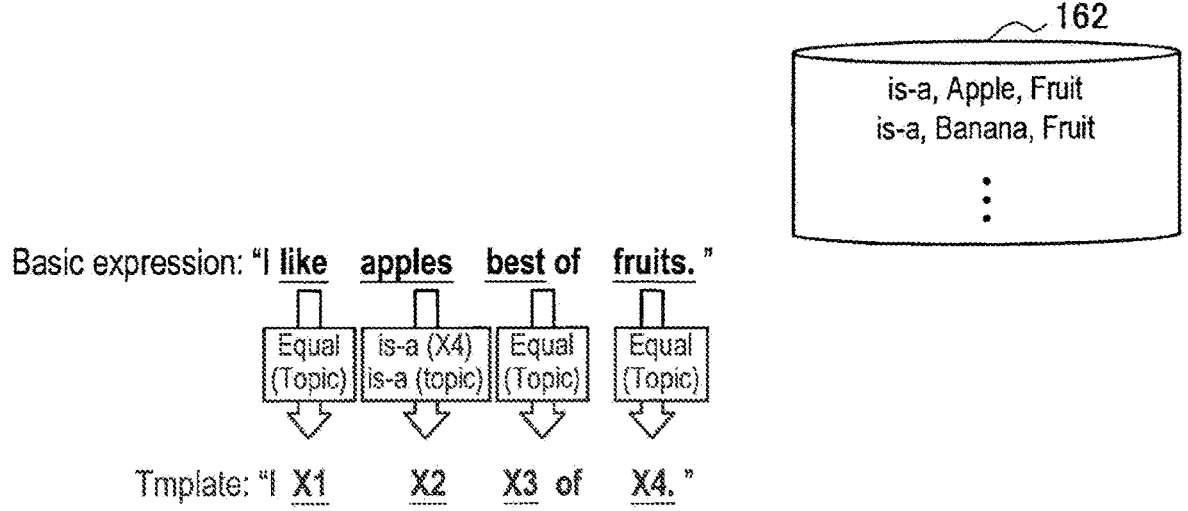

FIG.9
<SITUATION>
RAIN, ...
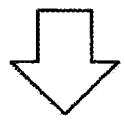
<NUMBER OF UTTERANCES IS SMALLER THAN THRESHOLD>
made-from, RAIN, WATER
made-from, TEA, WATER
can-drink, PERSON, TEA
⋮
— 162
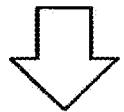
"IS  XX  YY?"
"XX  IS  YY"
⋮
— 164
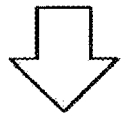
10
SO4
IS RAIN DRINKABLE?

F I G . 1 4
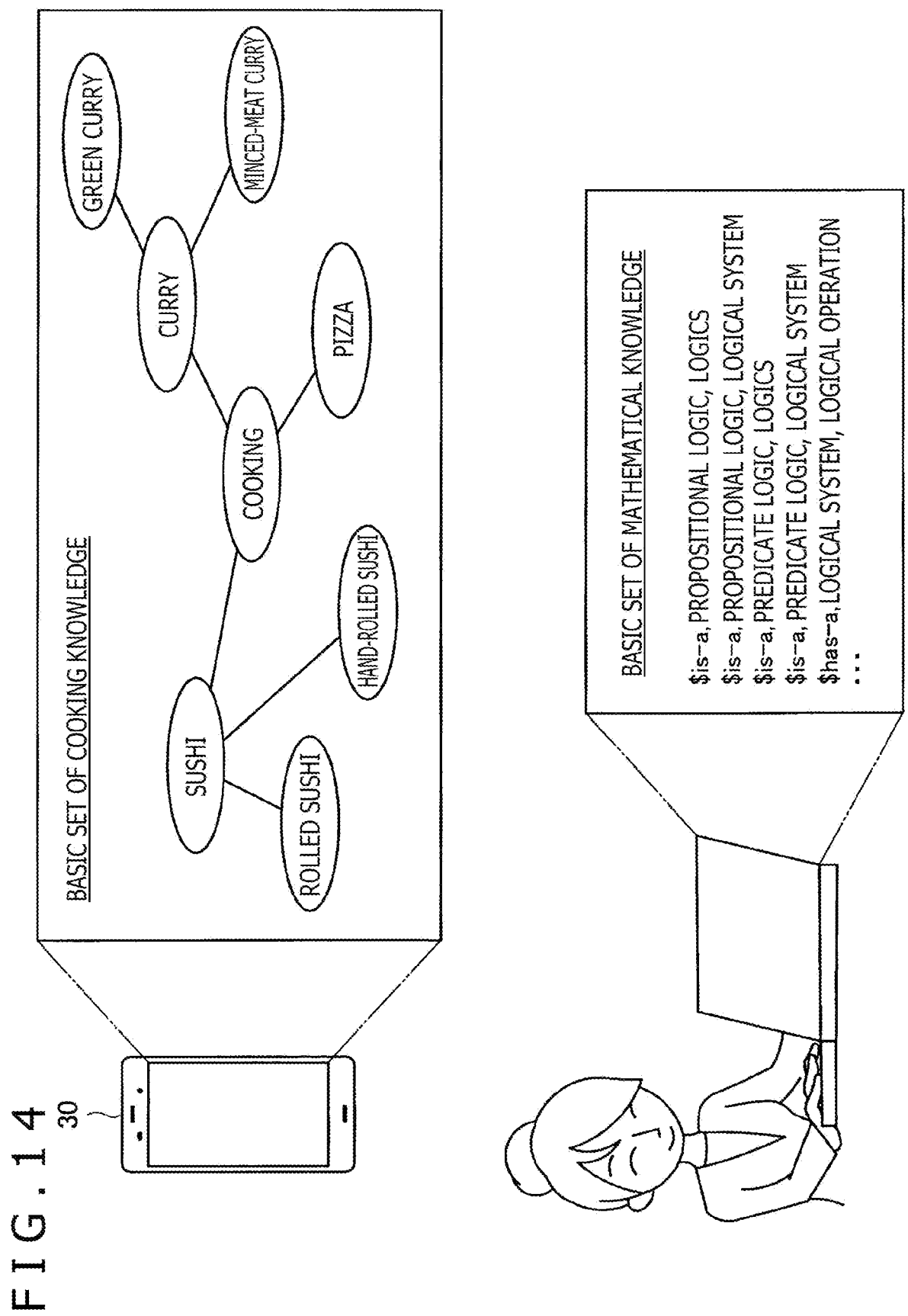

FIG.16
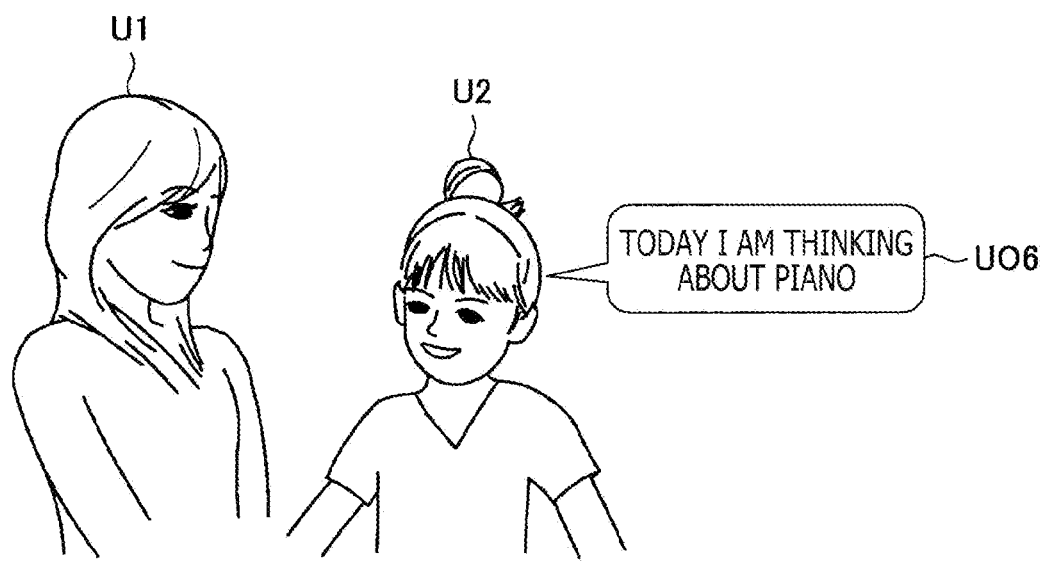
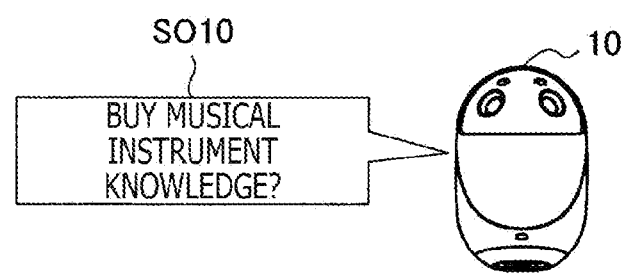

FIG.17
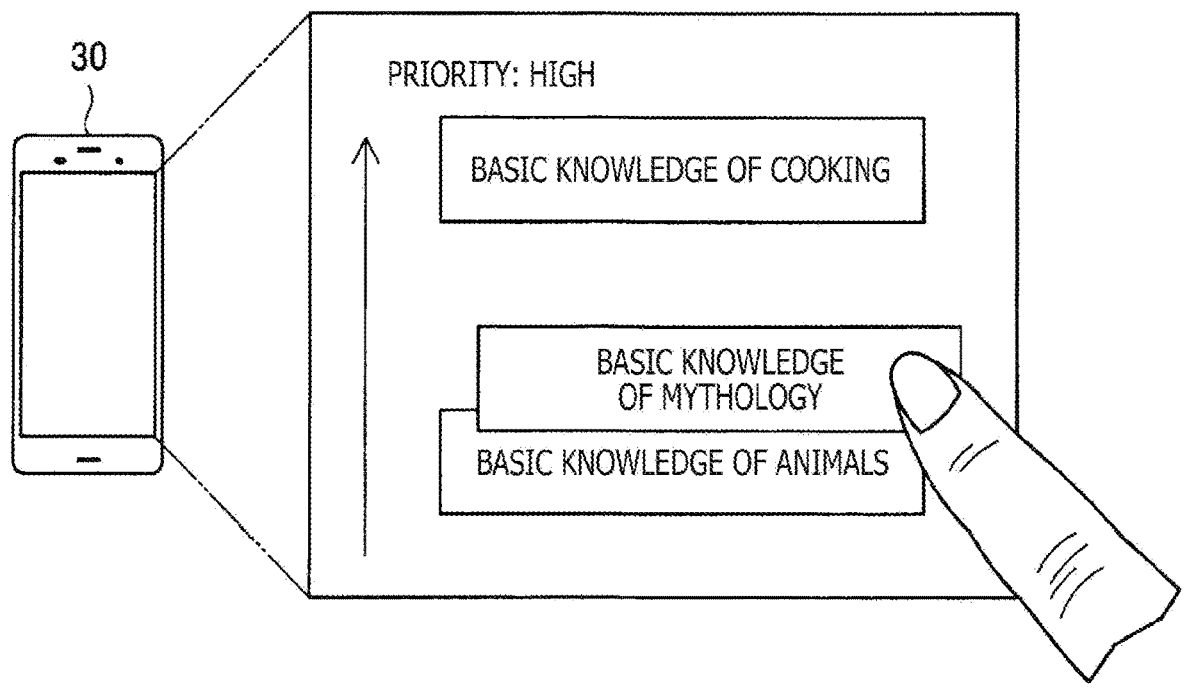
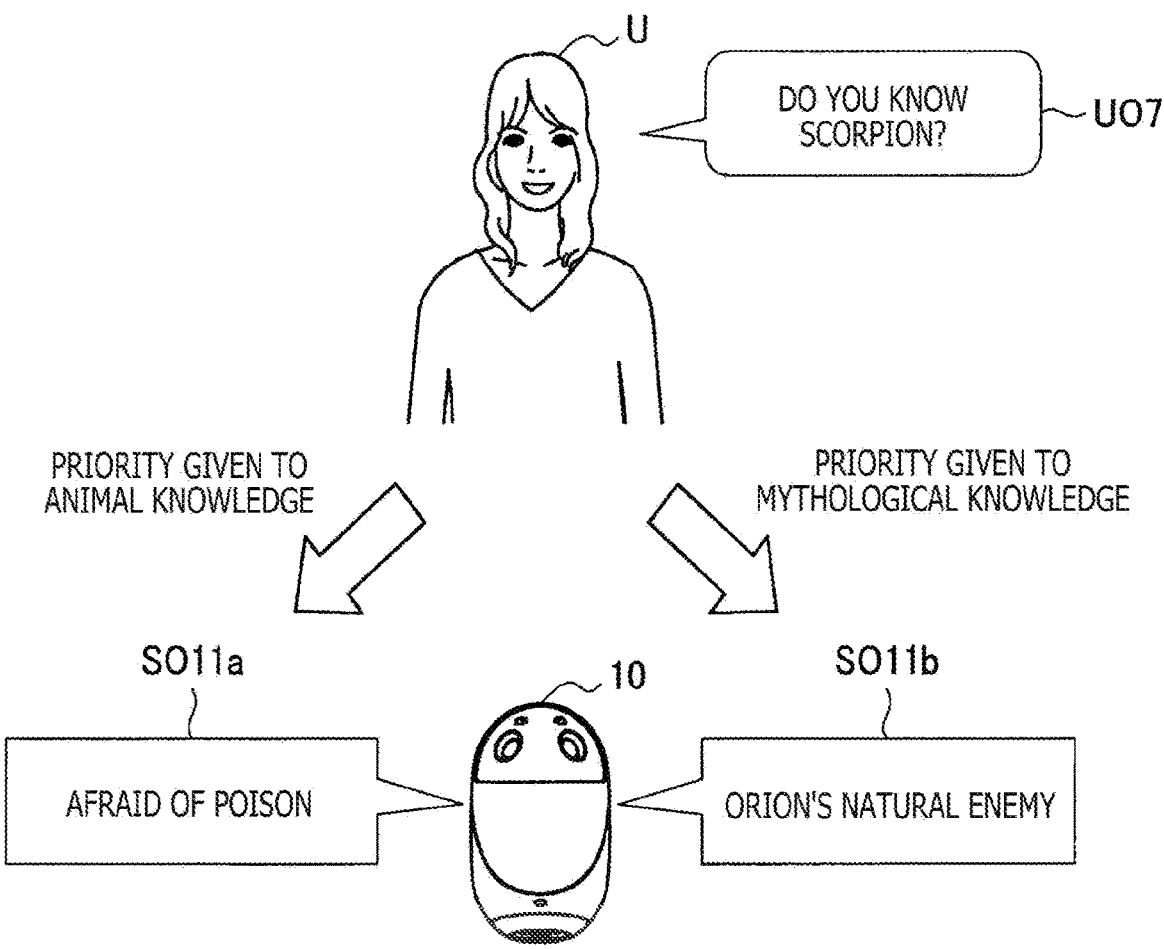

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/048579 filed on Dec. 11, 2019, which claims priority benefit of Japanese Patent Application No. JP 2019-008621 filed in the Japan Patent Office on Jan. 22, 2019. Each of the above-referenced applications is hereby incorporated herein by reference in its entirety.

TECHNICAL FIELD

The present disclosure relates to an information processing apparatus, an information processing method, and a program.

BACKGROUND ART

An apparatus that converses with a user by using, for example, speech recognition technique is widely used in recent years. Also, a technique for improving conversation performance of such an apparatus is proposed. Described, for example, in PTL 1 is a technique for implementing speech recognition appropriate for a specialized field by using field-specific dictionaries.

CITATION LIST

Patent Literature

[PTL 1]
Japanese Patent Laid-Open No. 2003-280683

SUMMARY

Technical Problem

The technique described in PTL 1 makes it possible to accurately recognize, for example, a vocabulary used in a specialized field. However, the technique described in PTL 1 makes it difficult to use, for example, expert knowledge for conversation.

Solution to Problem

According to one aspect of the present disclosure, there is provided an information processing apparatus including a control section that controls a conversation with a user according to a recognized situation, in which the control section acquires knowledge elements related to the recognized situation in terms of knowledge from knowledge sets, and determines contents of an utterance on the basis of the knowledge elements and an utterance template.

Also, according to another aspect of the present disclosure, there is provided an information processing method including controlling, by a processor, a conversation with a user according to a recognized situation, in which the controlling further includes acquiring knowledge elements related to the recognized situation in terms of knowledge from knowledge sets, and determining contents of an utterance on the basis of the knowledge elements and an utterance template.

Moreover, according to still another aspect of the present disclosure, there is provided a program for causing a computer to function as an information processing apparatus that includes a control section that controls a conversation with a user according to a recognized situation, in which the control section acquires knowledge elements related to the recognized situation in terms of knowledge from knowledge sets, and determines contents of an utterance on the basis of the knowledge elements and an utterance template.

BRIEF DESCRIPTION OF DRAWINGS

FIG. 2 is a diagram illustrating an example configuration of an information processing system according to the embodiment.
FIG. 5 is a diagram illustrating an example of generation of an utterance template according to the embodiment.
FIG. 9 is a diagram illustrating an example of utterance control exercised on the basis of an environment recognition result according to the embodiment.
FIG. 14 is a diagram illustrating knowledge set generation based on manual input according to the embodiment.
FIG. 16 is a diagram illustrating a function of recommending addition of a knowledge set according to the embodiment.
FIG. 17 is a diagram illustrating how to set usage priority of knowledge sets according to the embodiment.

DESCRIPTION OF EMBODIMENT

Figure 1:
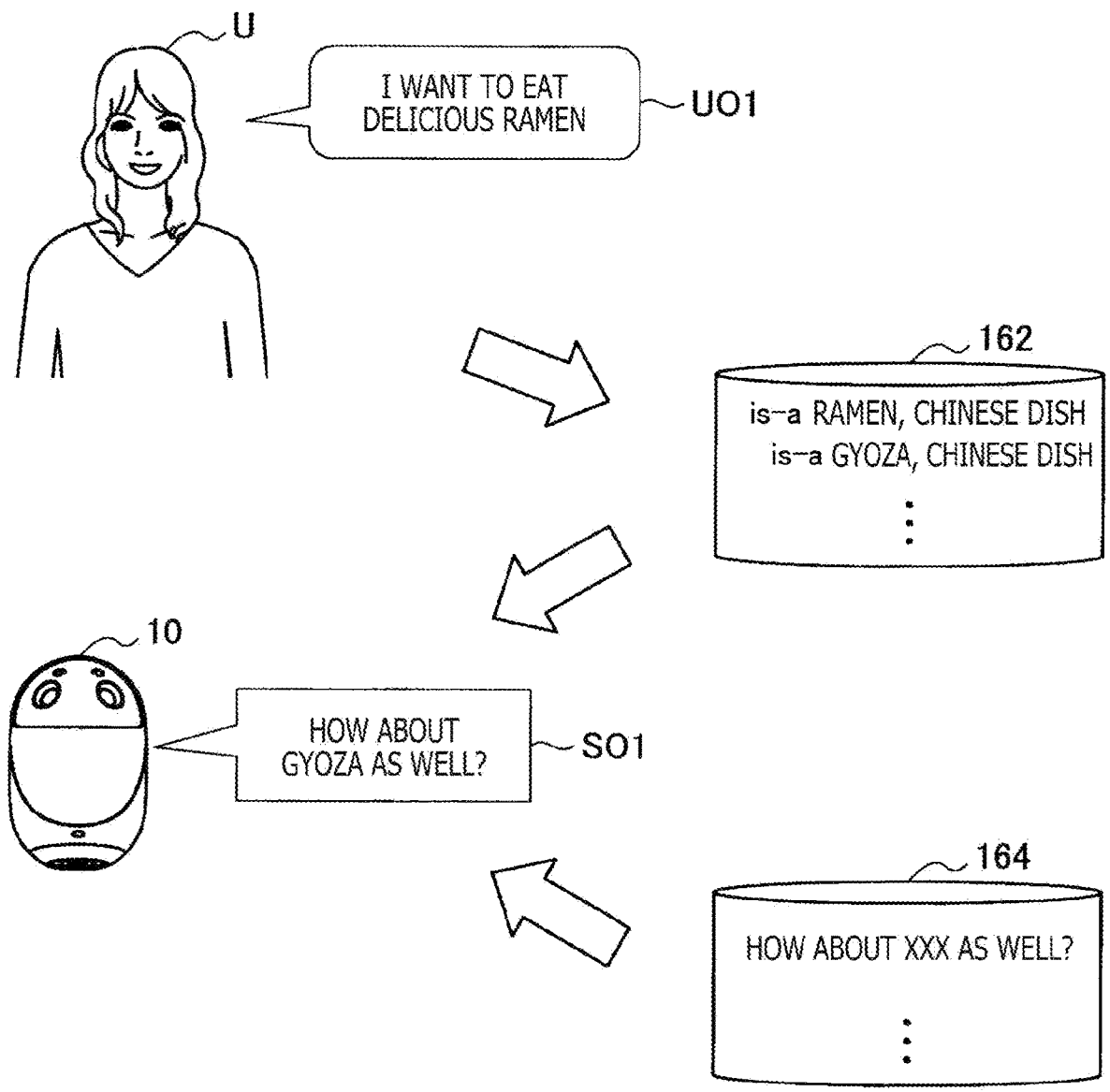
FIG. 1 is a diagram illustrating an overview of an embodiment of the present disclosure.

A preferred embodiment of the present disclosure will now be described in detail with reference to the accompanying drawings. In the present specification and in the accompanying drawings, components having substantially the same functional configuration are designated by the same reference signs and will not be redundantly described.

It should be noted that the description will be given in the following order.

1. Embodiment
   1.1. Overview
   1.2. Example of System Configuration
   1.3. Example Functional Configuration of Information Processing Apparatus 10
   1.4. Example Functional Configuration of Information Processing Server 20
   1.5. Details of Functions
2. Example of Knowledge Set Description
3. Example Hardware Configuration
4. Conclusion 1. Embodiment <<1.1. Overview>>

First, an overview of an embodiment of the present disclosure will be described below. As mentioned earlier, an apparatus that converses with a user is widely used in recent years. Such an apparatus provides a conversation with the user on the basis of, for example, results of speech recognition and intention analysis relating to user utterances.

However, in a case, for example, where the user utterances are highly specialized, a situation may arise such that the user utterances cannot accurately be recognized, and that the intention of user utterances cannot accurately be extracted. For example, in a case where the user says "Patent Cooperation Treaty" and such an uttered phrase does not exist in a speech recognition dictionary, it is difficult in some cases to obtain an accurate speech recognition result.

In order to cope with the above situation, for example, the technique described in PTL 1 uses field-specific dictionaries to increase the speech recognition accuracy for vocabularies in specific fields. However, the technique described in PTL 1 does not consider a mechanism for utilizing a recognized vocabulary for a conversation. Therefore, even in a case where the "Patent Cooperation Treaty" is recognized with high accuracy, the technique described in PTL 1 cannot utilize the result of recognition for a conversation where the recognized vocabulary is used, and ends up making a stylized response by saying, "I will search on a website" or the like.

The technical ideas according to the present disclosure have been conceived of by paying attention on the above issue, making it possible to provide a natural conversation with a user on the basis of various knowledge. Accordingly, an information processing apparatus 10 for implementing an information processing method according to an embodiment of the present disclosure includes a control section 150. The control section 150 controls a conversation with the user on the basis of a recognized situation. Also, one of features of the control section 150 according to an embodiment of the present disclosure is that the control section 150 acquires knowledge elements related to the recognized situation in terms of knowledge from knowledge sets, and determines the contents of an utterance on the basis of the knowledge elements and an utterance template.

FIG. 1 is a diagram illustrating an overview of an embodiment of the present disclosure. FIG. 1 depicts the information processing apparatus 10 that has a voice conversation with a user U. It should be noted that FIG. 1 depicts an example in which the information processing apparatus 10 according to the present embodiment is a robot apparatus that, based on the recognized situation, converses with the user and performs another autonomous operation.

For example, in a case where the user U gives an utterance UO1 by saying, "I want to eat delicious ramen," the information processing apparatus 10 performs speech recognition and intention analysis in accordance with the collected user utterance UO1, and acquires a recognized situation where the user U has uttered by saying, "I want to eat" and "ramen." As described above, the recognized situation according to the present embodiment includes, for example, the results of speech recognition and intention analysis of a user utterance, namely, a conversation history.

In the above instance, the information processing apparatus 10 according to the present embodiment acquires knowledge elements related to the word "ramen," which is included in the result of speech recognition of the utterance UO1, from a knowledge DB (database) 162 included in the information processing apparatus 10. Here, the knowledge DB 162 according to the present embodiment stores a plurality of knowledge sets that is described for each knowledge domain. It should be noted that FIG. 1 depicts an example of a knowledge set regarding a knowledge domain "Chinese dish" stored in the knowledge DB 162. It should also be noted that the knowledge domains according to the present embodiment may have a hierarchical structure where, for example, "Chinese dish" is layered under a knowledge domain "Dish" while "Beijing dish" is layered under "Chinese dish."

Further, the knowledge sets according to the present embodiment contain the description of a plurality of knowledge elements and the description of the relation between the knowledge elements. For example, in the case of a knowledge set regarding Chinese dishes, which is depicted in FIG. 1, knowledge elements "ramen" and "Chinese dish" are indicated by a relation "is-a (hypernym)." Similarly, knowledge elements "gyoza" and "Chinese dish" are indicated by the relation "is-a (hypernym)." The descriptions in FIG. 1 indicate that the knowledge element "Chinese dish" is a hypernym for "ramen" and "gyoza."

In the above case, the control section 150 of the information processing apparatus 10 according to the present embodiment is able to acquire the knowledge element "gyoza" having the same hypernym "Chinese dish" as "ramen," which is included in the utterance UO1 of the user U, from a knowledge set regarding Chinese dishes, which is stored in the knowledge DB 162. As described above, the knowledge elements according to the present embodiment include, for example, a vocabulary.

Further, based on the intention of an utterance of the user U, the control section 150 selects an utterance template corresponding to the intention of the utterance of the user U from a template DB 164 included in the information processing apparatus 10, and determines the contents of the utterance by applying the acquired knowledge element "gyoza" to the utterance template. In the case of the example depicted in FIG. 1, the control section 150 causes the information processing apparatus 10 to output a system utterance SO1 "How about gyoza as well?" by applying a knowledge set "gyoza" to an utterance template "How about XXX as well?" in order to indicate the intention of recommendation.

As described above, the information processing apparatus 10 according to the present embodiment is able to provide a flexible and natural conversation depending on a recognized situation by determining the contents of an utterance by use of a knowledge set and an utterance template.

Further, the knowledge sets according to the present embodiment may permit addition of a knowledge set and set usage priority of the knowledge sets. Accordingly, adding a knowledge set and setting the usage priority of the knowledge sets makes it possible to flexibly change (customize) the utterance to be given by the information processing apparatus 10 depending on user preferences and needs.

Consequently, the information processing apparatus 10 according to the present embodiment is able to cope with various situations by using the knowledge sets, and is capable of increasing the number of types and variations of conversations by adding knowledge sets. Further, the information processing apparatus 10 according to the present embodiment is able to dynamically generate the contents of an utterance on the basis of the knowledge sets, and is thus capable of providing variations richer than a conventional rule-based conversation and scenario-based conversation. This makes it possible to provide a flexible and natural conversation different from simple function calls.

<<1.2. Example of System Configuration>>

An example configuration of an information processing system according to the present embodiment will now be described. FIG. 2 is a diagram illustrating an example configuration of the information processing system according to the present embodiment. Referring to FIG. 2, the information processing system according to the present embodiment includes the information processing apparatus 10, an information processing server 20, and an information processing terminal 30. Further, the above components are communicatively connected through a network 40.

(Information Processing Apparatus 10)

The information processing apparatus 10 according to the present embodiment is one of various types of apparatuses that converse with the user by using a knowledge set and an utterance template. The information processing apparatus 10 according to the present embodiment may be, for example, a robot apparatus that converses with the user and performs another autonomous operation on the basis of a recognized situation. However, the information processing apparatus 10 according to the present embodiment is not limited to the above example, and may be, for instance, a smartphone, a tablet, a PC (Personal Computer), a dedicated apparatus having a conversation function, or the like.

(Information Processing Server 20)

The information processing server 20 according to the present embodiment is an apparatus for storing knowledge sets to be downloaded to the information processing apparatus 10. Further, the information processing server 20 according to the present embodiment controls a user interface that allows the user to add a knowledge set to the information processing apparatus 10.

(Information Processing Terminal 30)

The information processing terminal 30 according to the present embodiment is an apparatus for performing operations including an operation for adding a knowledge set to the information processing apparatus 10. Under the control of the information processing server 20, the information processing terminal 30 according to the present embodiment displays the user interface for performing the above-mentioned operations. The information processing terminal 30 according to the present embodiment may be, for example, a smartphone, a tablet, a PC, or the like.

(Network 40)

The network 40 has a function of connecting various components included in the information processing system. The network 40 may include, for example, public networks such as the Internet, a telephone network, and a satellite communication network, and various types of LANs (Local Area Networks), WANs (Wide Area Networks) including an Ethernet (registered trademark) network, and the like. Further, the network 40 may include a leased line network such as an IP-VPN (Internet Protocol-Virtual Private Network). Furthermore, the network 40 may include a wireless communication network such as a Wi-Fi (registered trademark) network or a Bluetooth (registered trademark) network.

An example configuration of the information processing system according to the present embodiment has been described above. It should be noted that the configuration described above with reference to FIG. 2 is merely an example, and that the configuration of the information processing system according to the present embodiment is not limited to the above-described one. The configuration of the information processing system according to the present embodiment may be flexibly modified according to specifications and applications.

<<1.3. Example Functional Configuration of Information Processing Apparatus 10>>

Figure 3:
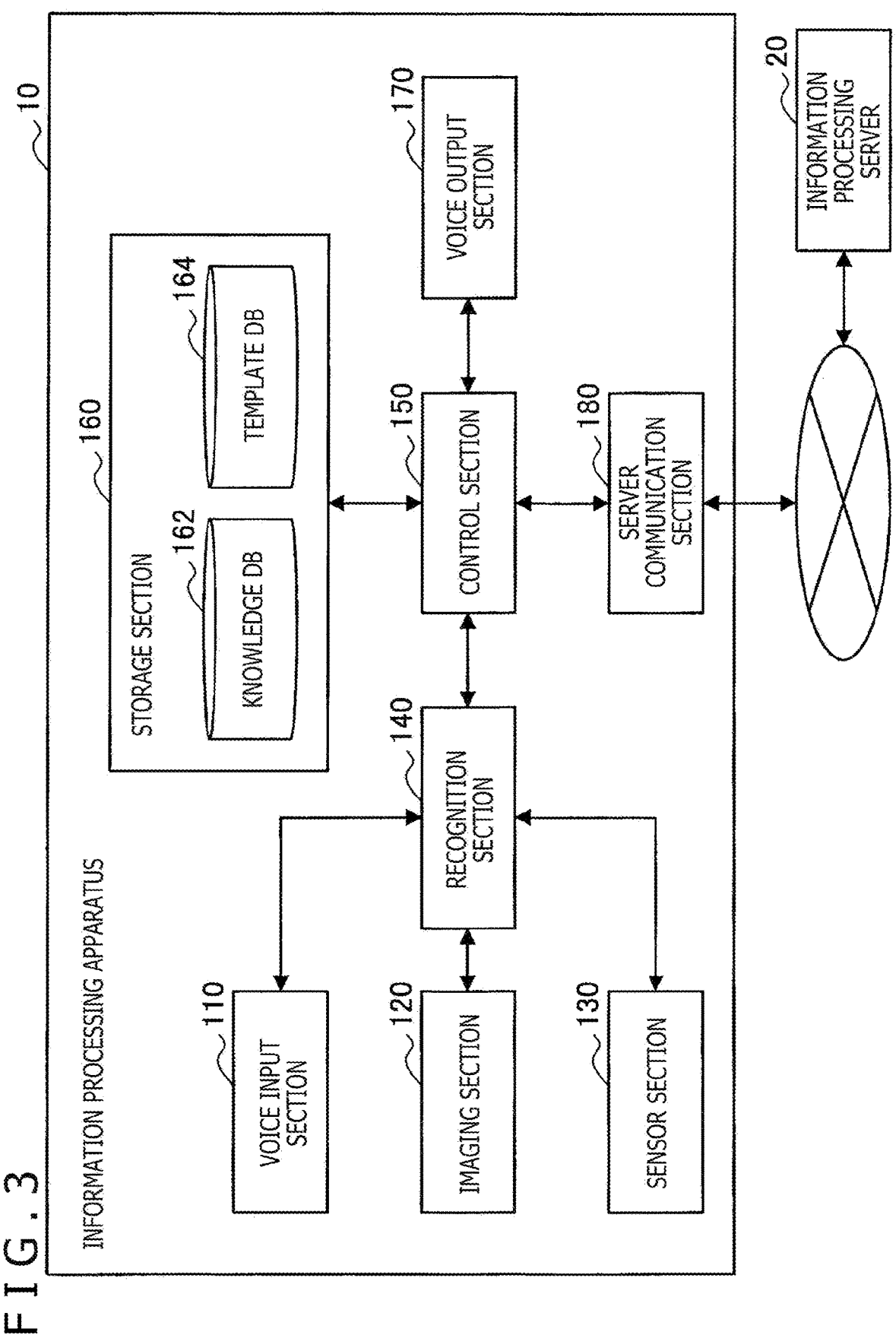
FIG. 3 is a block diagram illustrating an example functional configuration of an information processing apparatus according to the embodiment.

An example functional configuration of the information processing apparatus 10 according to the present embodiment will now be described. FIG. 3 is a block diagram illustrating an example functional configuration of the information processing apparatus 10 according to the present embodiment. Referring to FIG. 3, the information processing apparatus 10 according to the present embodiment includes a voice input section 110, an imaging section 120, a sensor section 130, a recognition section 140, the control section 150, a storage section 160, a voice output section 170, and a server communication section 180.

(Voice Input Section 110)

The voice input section 110 according to the present embodiment collects a voice uttered by the user, an environmental sound in the surrounding area, and the like. To achieve such a purpose, the voice input section 110 according to the present embodiment includes a microphone.

(Imaging Section 120)

The imaging section 120 according to the present embodiment captures an image of the user and an image of the area surrounding the user. To achieve such a purpose, the imaging section 120 according to the present embodiment includes a camera apparatus and the like.

(Sensor Section 130)

The sensor section 130 according to the present embodiment collects various types of sensing information regarding the user, the information processing apparatus 10, the surrounding environment, and the like. To achieve such a purpose, the sensor section 130 according to the present embodiment includes, for example, an acceleration sensor, a gyro sensor, a geomagnetic sensor, an optical sensor, a temperature sensor, a pressure sensor, a GNSS (Global Navigation Satellite System) signal receiver, and the like.

(Recognition Section 140)

The recognition section 140 according to the present embodiment comprehensively recognizes a situation on the basis of sound information collected by the voice input section 110, image information collected by the imaging section 120, sensing information collected by the sensor section 130, and the results of speech recognition and intention analysis by the information processing server 20.

(Control Section 150)

The control section 150 according to the present embodiment controls various components included in the information processing apparatus 10. Also, the control section 150 according to the present embodiment has one feature that it acquires knowledge elements related, in terms of knowledge, to the recognized situation recognized by the recognition section 140 from knowledge sets and determines the contents of an utterance on the basis of the knowledge elements and an utterance template. Functions of the control section 150 according to the present embodiment will be described in detail later.

(Storage Section 160)

The storage section 160 according to the present embodiment includes the knowledge DB 162 and the template DB 164. The knowledge DB 162 stores the knowledge sets. The template DB 164 stores utterance templates.

The knowledge sets according to the present embodiment have a plurality of knowledge elements and the relation between them described therein. The knowledge elements according to the present embodiment may include, for example, a vocabulary, an operation, an image, a sound, and the like.

The knowledge sets according to the present embodiment may be, for example, an aggregation that has a triple structure and that contains three sets including knowledge elements and concepts. This structure contains, for example, an RDF (Resource Description Framework) triple structure formed by three knowledge elements and a binary relation structure indicating a relation where a predicate is "is-a (hypernym)." Table 1 below indicates the binary relation according to the present embodiment.

TABLE 1

| $synonym | Synonym | $synonym, beverage, drink<br>$synonym, cocoa, cacao |
|---|---|---|
| $is-a | Hypernym | $is-a, cocoa, drink<br>$is-a, poodle, dog |
| -$is-a | Hyponym | -$is-a, cake, cheese cake<br>-$is-a, mathematics, applied mathematics<br>-$is-a, water, well water |
| $part-of | Constituent (part)<br>Indicates a part such as a part of a body. | $part-of, Japan, Asia<br>$part-of, tea leaf, tea tree<br>$part-of, fang, wild boar |
| -$part-of | Non-constituent | -$part-of, Japan, Osaka<br>-$part-of, house, kitchen<br>-$part-of, complex number, imaginary number |
| $made-from | Indicates a material or a constituent. Different from "Part-of" and the target is beyond recognition. | $made-from, water, hydrogen<br>$made-from, hot chocolate, cocoa<br>$made-from, milk, protein |
| -$made-from | Non-material or non-constituent | -$made-from, cacao, cocoa<br>-$made-from, water, tears<br>-$made-from, tea leaf, tea |
| $member-of | Constituent (constituent member)<br>The target is a group, a class, etc. | $member-of, dog, Canis |
| -$member-of | Non-constituent (non-constituent member) | -$member-of, Japan, Japanese<br>-$member-of, government, parliament |
| $in-domain-category | A category in which an item falls | $in-domain-category, house, anthropology<br>$in-domain-category, mathematics, science<br>$in-domain-category, politics, political science |

TABLE 1-continued

| -$in-domain-category | An element belonging to a category | -$in-domain-category, mathematics, symmetry<br>-$in-domain-category, political science, conspiracy |
|---|---|---|
| $in-domain-region | A region to which an item is ascribed | $in-domain-region, sake, Japan |
| -$in-domain-region | An element to which a region belongs | -$in-domain-region, Japan, sumo wrestling<br>-$in-domain-region, soccer, free kick |
| $is-instance-of | Indicates a specific example | $is-instance-of, Japan, Asian country |
| -$is-instance-of | Indicates a superordinate concept | -$is-instance-of, sword, Excalibur |
| $has-a | Indicates ownership | $has-a, Taro, car |
| -$has-a | Indicates an unowned item | -$has-a, car, Taro |
| $entail | Implication | $enta, eat, crunch |

It should be noted that the binary relation indicated in Table 1 above is merely an example. The binary relation according to the present embodiment is not limited to such an example. The binary relation according to the present embodiment may include various types of verbs such as eat, satisfy, like, dislike, come, and go. Further, the knowledge sets according to the present embodiment may be described by a semantic network or an ontology structure.

(Voice Output Section 170)

Under the control of the control section 150, the voice output section 170 according to the present embodiment outputs a voice corresponding to the contents of an utterance determined by the control section 150. To achieve such a purpose, the voice output section 170 according to the present embodiment includes, for example, a speaker and an amplifier.

(Server Communication Section 180)

The server communication section 180 according to the present embodiment communicates information with the information processing server 20 through the network 40. The server communication section 180 according to the present embodiment receives, for example, information regarding the knowledge sets from the information processing server 20.

An example functional configuration of the information processing apparatus 10 according to the present embodiment has been described above. It should be noted that the configuration described above with reference to FIG. 3 is merely an example. The example functional configuration of the information processing apparatus 10 according to the present embodiment is not limited to such an example. The information processing apparatus 10 according to the present embodiment may include, for example, a display section for displaying a text or the like corresponding to the contents of an utterance determined by the control section 150, a drive section for implementing various types of operations, and the like. The functional configuration of the information processing apparatus 10 according to the present embodiment may be flexibly modified according to specifications and applications.

<<1.4. Example Functional Configuration of Information Processing Server 20>>

Figure 4:
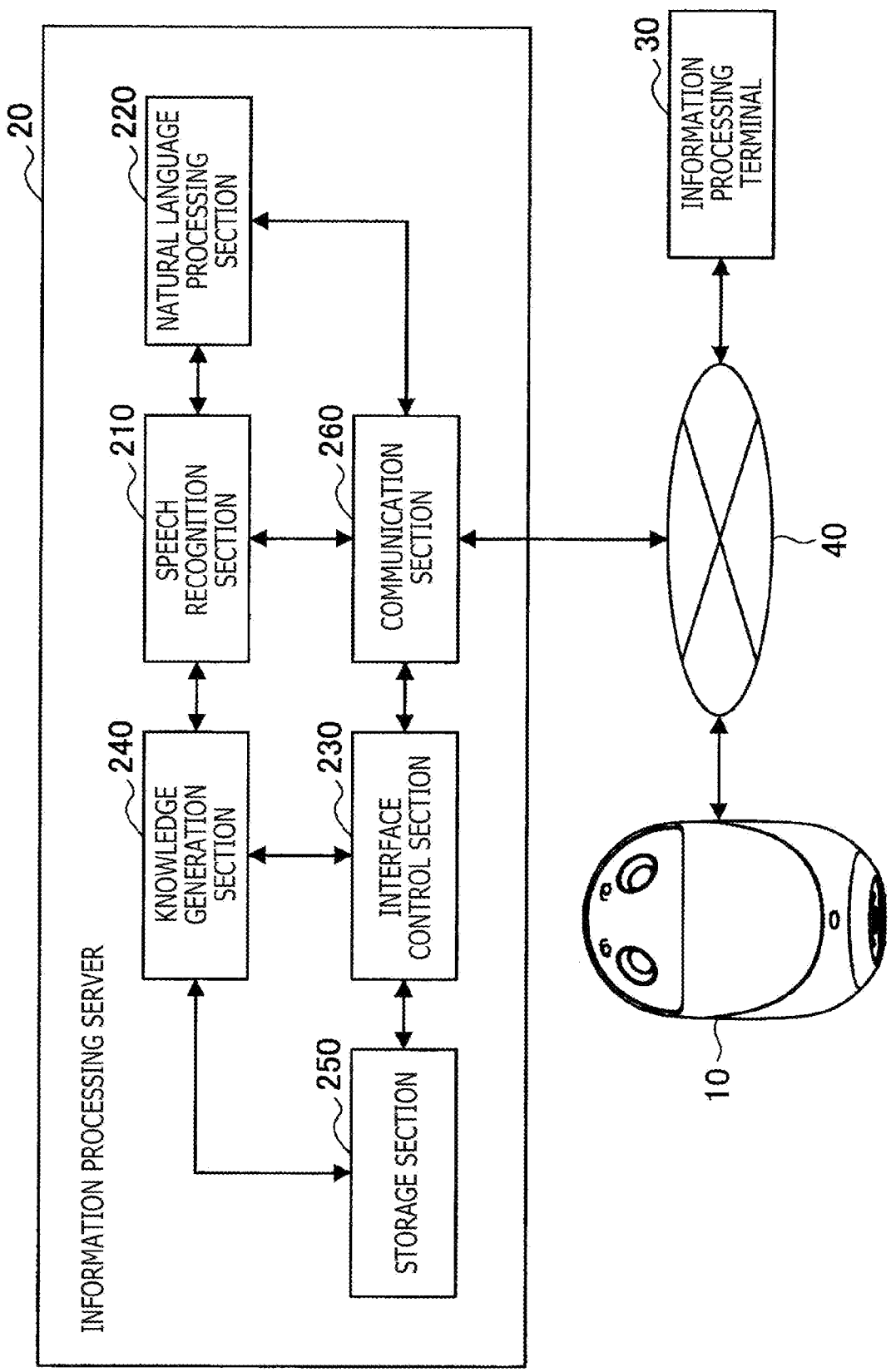
FIG. 4 is a block diagram illustrating an example functional configuration of an information processing server according to the embodiment.

An example functional configuration of the information processing server 20 according to the present embodiment will now be described. FIG. 4 is a block diagram illustrating an example functional configuration of the information processing server 20 according to the present embodiment. Referring to FIG. 4, the information processing server 20 according to the present embodiment includes a speech recognition section 210, a natural language processing section 220, an interface control section 230, a knowledge generation section 240, a storage section 250, and a communication section 260.

(Speech Recognition Section 210)

The speech recognition section 210 according to the present embodiment receives a voice uttered by the user from the information processing apparatus 10, and converts the received voice to a text string by performing an ASR (Automatic Speech Recognition) process based on the received voice.

(Natural Language Processing Section 220)

The natural language processing section 220 according to the present embodiment extracts the intention of the utterance of the user by performing a natural language understanding (NLU (Natural Language Understanding)) process based on the text string generated by the speech recognition section 210.

(Interface Control Section 230)

The interface control section 230 according to the present embodiment controls a user interface for adding a knowledge set to the information processing apparatus 10, and the like. The user is allowed to access the user interface by using the information processing terminal 30 owned by the user and to add a knowledge set to the information processing apparatus 10, and the like.

(Knowledge Generation Section 240)

The knowledge generation section 240 according to the present embodiment generates knowledge sets. Functions of the knowledge generation section 240 according to the present embodiment will be described in detail later.

(Storage Section 250)

The storage section 250 according to the present embodiment stores knowledge sets generated by the knowledge generation section 240.

(Communication Section 260)

The communication section 260 according to the present embodiment communicates information with the information processing apparatus 10 and the information processing terminal 30 through the network 40. For example, according to a user operation at the information processing terminal 30, the communication section 260 according to the present embodiment transmits information regarding the knowledge sets to the information processing apparatus 10.

An example functional configuration of the information processing server 20 according to the present embodiment has been described above. It should be noted that the configuration described above with reference to FIG. 4 is merely an example. The example functional configuration of the information processing server 20 according to the present embodiment is not limited to such an example. The functional configuration of the information processing server 20 according to the present embodiment can be flexibly modified according to specifications and applications.

<<1.5. Details of Functions>>

Functions of the information processing apparatus 10 according to the present embodiment will now be described in detail. First, the utterance templates according to the present embodiment are described below. As described earlier, the utterance templates according to the present embodiment are templates used to determine the contents of an utterance. The utterance templates according to the present embodiment are generated, for example, from a dialogue example corpus or the like.

FIG. 5 is a diagram illustrating an example of generation of an utterance template according to the present embodiment. The example in FIG. 5 depicts a dialogue example corpus regarding favorite fruits. In this case, speech recognition and natural language processing are first performed on each utterance included in the dialogue example corpus. Further, the topic related to the dialogue example corpus is identified as regarding "Like" of "Fruits" from the knowledge sets stored in the knowledge DB 162.

In the above case, the control section 150 extracts nouns ("fruits" and "apple"), a verb ("like"), an adjective ("best") from an utterance used as the source, converts them to variables, and generates an utterance template regarding "Impression" such as "I X1 X2 X3 of X4." as depicted in FIG. 5, for example.

As described above, the control section 150 according to the present embodiment is able to generate, from an utterance example, an utterance history, and the like, an utterance template that is stored under the restriction of relations between variables. Such a function makes it possible to efficiently increase the number of utterance templates and to generate more natural utterance templates based on user utterances or the like.

Figure 6:
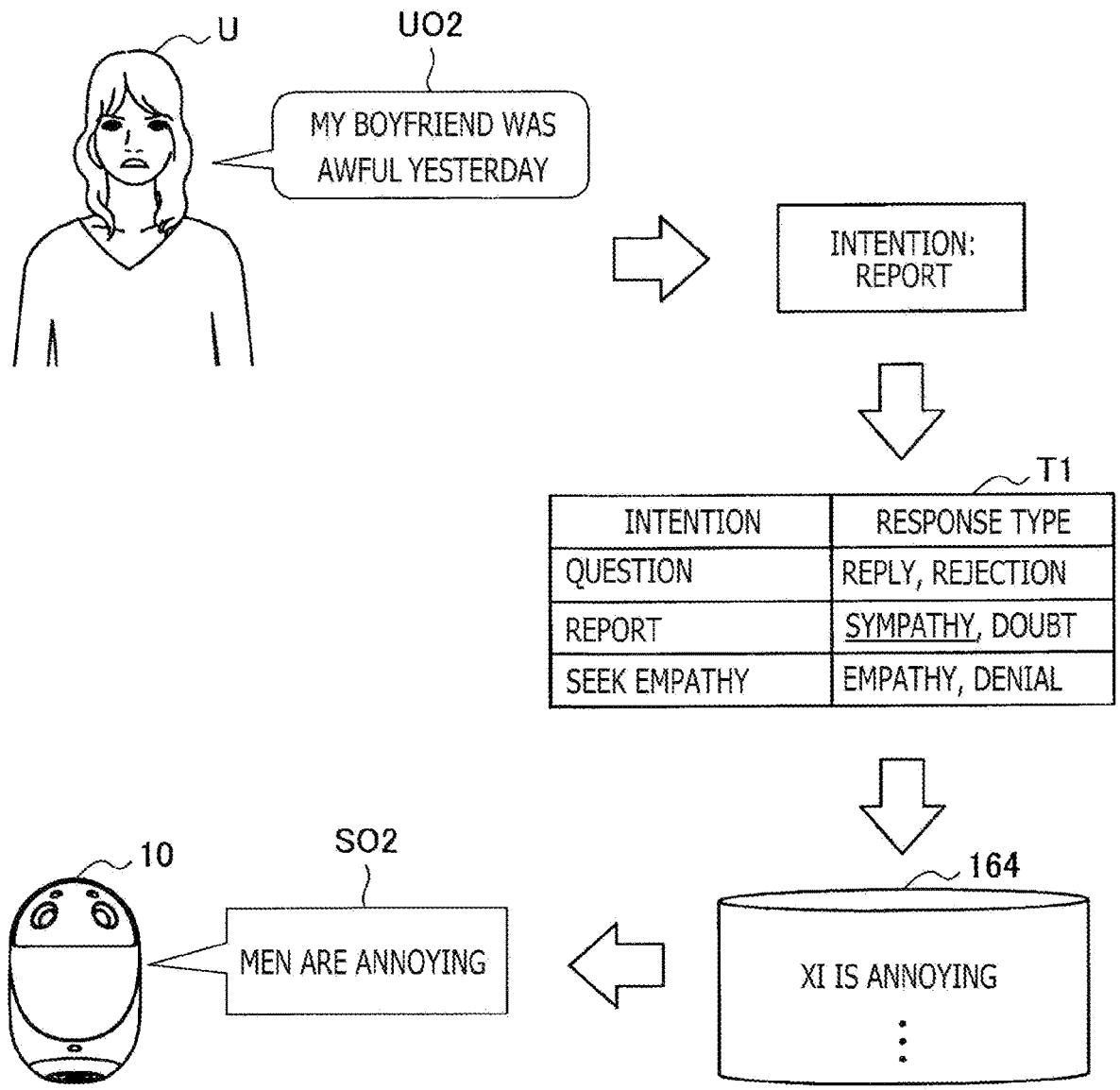
FIG. 6 is a diagram illustrating an example of determining contents of an utterance by using an utterance template according to the embodiment.

The following describes an example of determining the contents of an utterance by using an utterance template according to the present embodiment. FIG. 6 is a diagram illustrating an example of determining the contents of an utterance by using an utterance template according to the present embodiment. In the case of the example depicted in FIG. 6, the user U has given an utterance UO2 by saying, "My boyfriend was awful yesterday."

In the above case, the information processing server 20 receives a voice of the utterance UO2 collected by the information processing apparatus 10, and performs speech recognition and natural language processing on the received voice. In the example depicted in FIG. 6, an intention "Report" is extracted. Subsequently, the control section 150 determines the type of utterance template corresponding to the intention of the utterance of the user by using a template type determination table T1 and the results of speech recognition and natural language processing received from the information processing server 10.

In the case of the example depicted in FIG. 6, a template type "Sympathy" corresponding to the intention "Report" is selected by the control section 150. The control section 150 may determine the template type on the basis of the result of analysis of an emotion of the user in addition to the intention of the utterance of the user, and the like.

Subsequently, the control section 150 acquires an utterance template corresponding to the determined template type "Sympathy" from the template DB 164, accesses the knowledge DB 162 to acquire a concept to be applied to a variable section X1, determines to use "Men are annoying" as the contents of an utterance, and causes the voice output section 170 to output a system utterance SO2 corresponding to the contents of the utterance. It should be noted that, in a case where the concept to be applied to the variable section is not successfully acquired in the above instance, the control section 150 may select a different utterance template in order to determine the contents of the utterance.

An example of determining the contents of an utterance by using an utterance template according to the present embodiment has been described above. The above-described function of the control section 150 according to the present embodiment makes it possible to provide a flexible and natural conversation by selecting an utterance template corresponding to the intention of the utterance of the user and applying a concept according to the situation to the variable section included in the selected utterance template.

Generating the contents of a response by using a knowledge set according to the present embodiment will now be described in more detail. As described above, the control section 150 according to the present embodiment is able to provide conversations suitable for various types of situations (recognized situations) recognized by the recognition section 140 through the use of a plurality of knowledge sets described for each knowledge domain.

Figure 7:
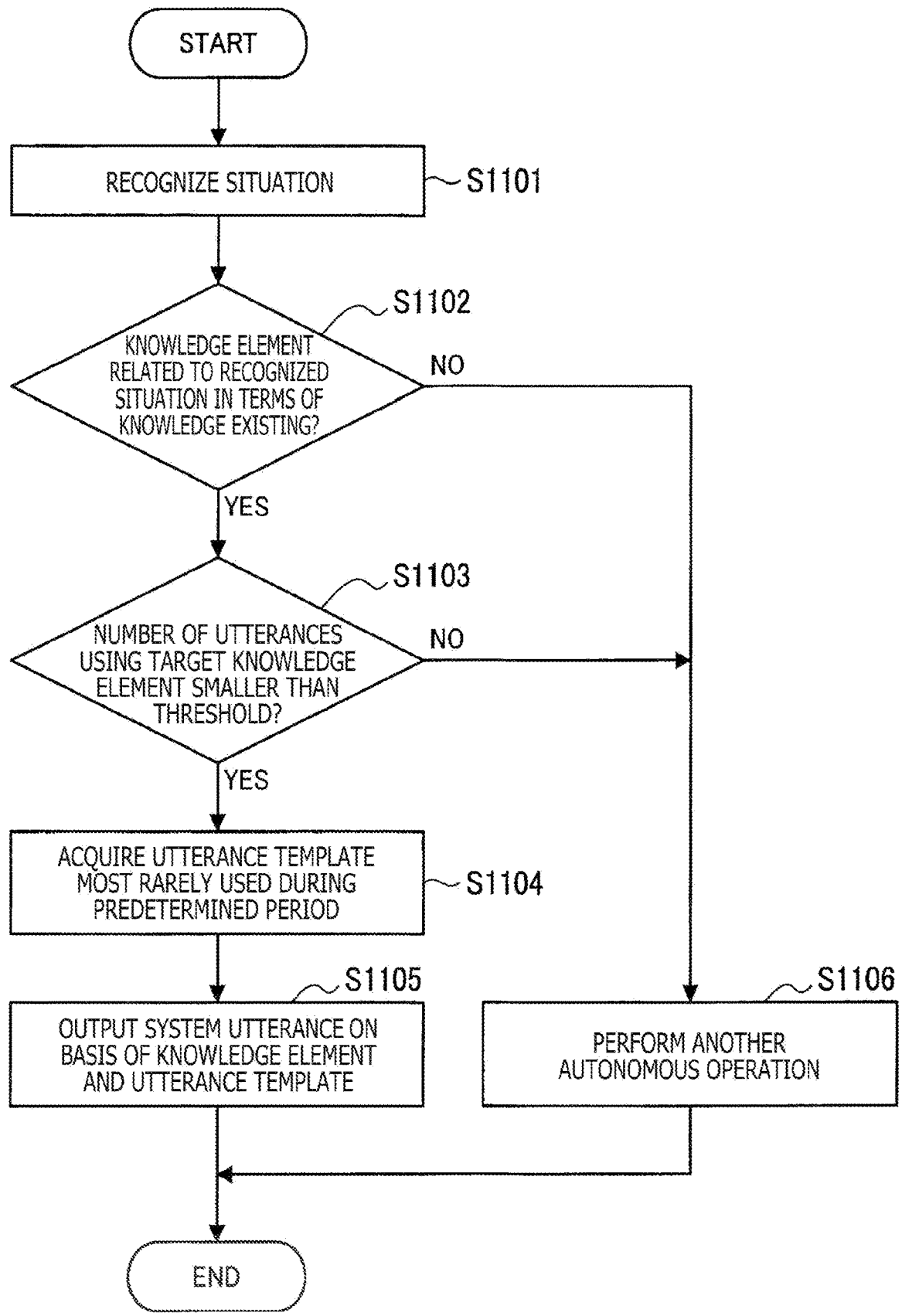
FIG. 7 is a flowchart illustrating how utterance control is exercised by using knowledge sets according to the embodiment.

FIG. 7 is a flowchart illustrating how utterance control is exercised by using the knowledge sets according to the present embodiment. Referring to FIG. 7, first of all, the recognition section 140 recognizes the situation on the basis of the sound information, the image information, the sensing information, and the results of various types of processes performed by the information processing server 20 (step S1101).

Next, the control section 150 determines whether or not a knowledge element related in terms of knowledge to the situation recognized in step S1101 exists in the knowledge sets (step S1102).

Further, the control section 150 determines whether or not the number of utterances using the targeted knowledge element during a predetermined period is smaller than a threshold (step S1103).

In a case where no knowledge element related to the recognized situation exists ("NO" at step S1102) or the number of utterances using the targeted knowledge element is equal to or greater than the threshold ("NO" at step S1103), the control section 150 causes the information processing apparatus 10 to perform another autonomous operation (an operation other than giving an utterance by using the knowledge sets) (step S1106).

Meanwhile, in a case where a knowledge element related to the recognized situation exists ("YES" at step S1102) and the number of utterances using the targeted knowledge element is smaller than the threshold ("YES" at step S1103), the control section 150 selects an utterance template that has been used by a smaller number of times than the threshold during the predetermined period. In this case, the control section 150 may acquire an utterance template that has been most rarely used during the predetermined period (step S1104).

Subsequently, the control section 150 determines the contents of the utterance on the basis of the knowledge element and the utterance template, and causes the voice output section 170 to output a system utterance corresponding to the contents of the utterance (step S1105).

The flow of utterance control exercised by using the knowledge sets according to the present embodiment has been described above. As the above-described control is exercised by the control section 150 according to the present embodiment, it is possible to prevent the same knowledge element and utterance template from being frequently used in the predetermined period, and to provide a conversation including various utterances.

Specific examples of utterance control according to the present embodiment will now be described. The recognized situation according to the present embodiment may include, for example, an object recognition result, an environment recognition result, location information, a speech recognition result, an intention analysis result, and the like.

Figure 8:
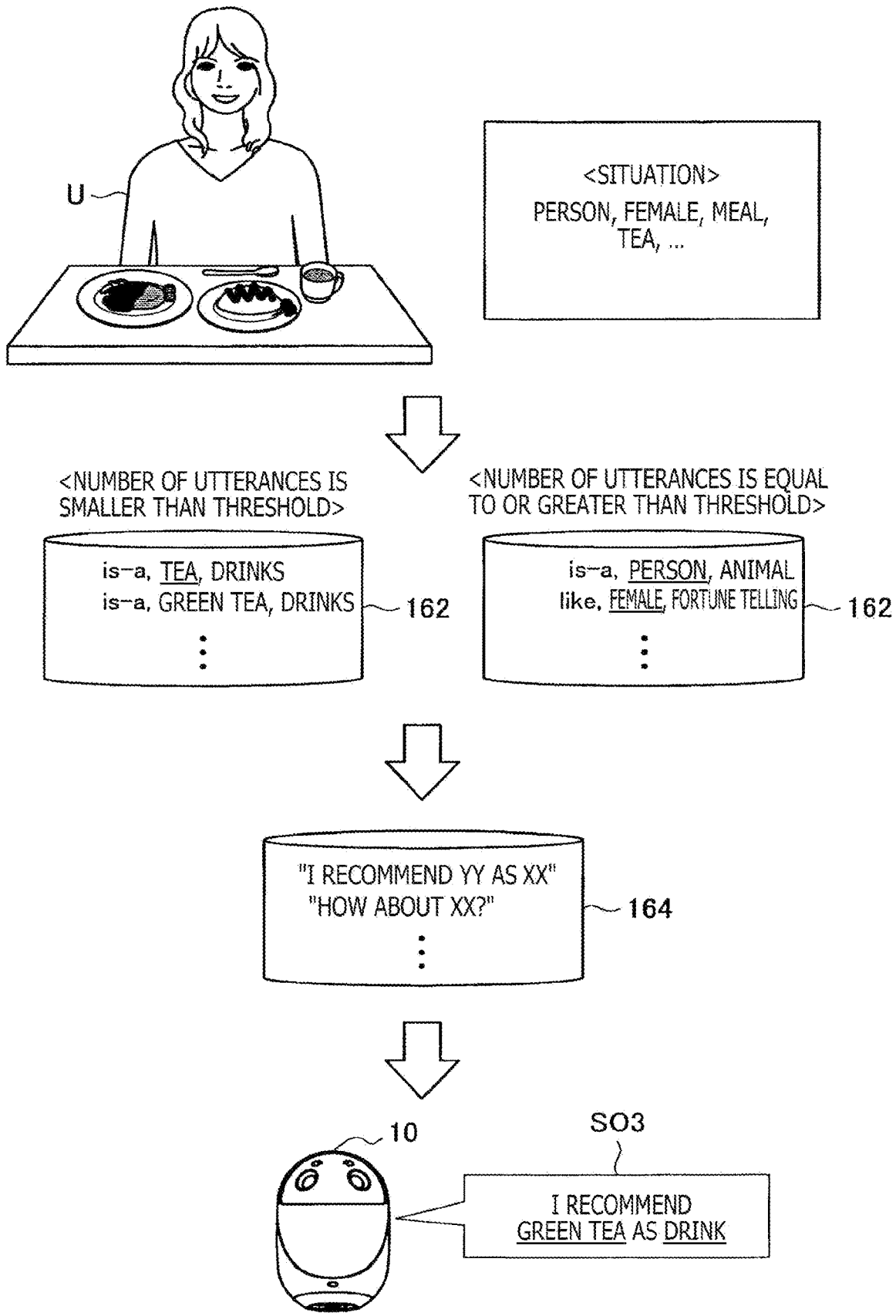
FIG. 8 is a diagram illustrating an example of utterance control exercised on the basis of an object recognition result according to the embodiment.

FIG. 8 is a diagram illustrating an example of utterance control that is exercised on the basis of an object recognition result according to the present embodiment. In the example depicted in FIG. 8, the recognition section 140 performs object recognition based on an image captured by the imaging section 120, and acquires related words (e.g., "person," "female," "meal," and "tea"). It should be noted that object recognition may be performed by the information processing server 20.

In the above case, the control section 150 according to the present embodiment accesses the knowledge DB 162, and acquires knowledge elements that are related to the result of object recognition and used for utterance by a smaller number of times than the threshold. Further, the control section 150 acquires an utterance template from the template DB 164, and determines the contents of an utterance by applying the knowledge elements acquired as mentioned above to the variable section of the utterance template.

When control is exercised as described above in a situation where the user U is drinking tea as depicted in FIG. 8, it is possible to output, for example, a system utterance SO3 "I recommend green tea as a drink," and provide a more natural conversation according to a recognized object.

Further, FIG. 9 is a diagram illustrating an example of utterance control that is exercised on the basis of an environment recognition result according to the present embodiment. In the example depicted in FIG. 9, the recognition section 140 performs environment recognition (sound analysis) based on an environmental sound collected by the voice input section 110, and acquires a related word ("rain"). It should be noted that environment recognition may be performed by the information processing server 20.

In the above case, the control section 150 according to the present embodiment accesses the knowledge DB 162, and acquires knowledge elements that are related to the result of environment recognition and used for utterance by a smaller number of times than the threshold. Further, the control section 150 acquires an utterance template from the template DB 164, and determines the contents of an utterance by applying the knowledge elements acquired as mentioned above to the variable section of the utterance template.

When control is exercised as described above in a situation where it is raining as depicted in FIG. 9, it is possible to output, for example, a system utterance SO4 "Is rain drinkable?" and provide a more natural conversation based on various situations such as weather.

Figure 10:
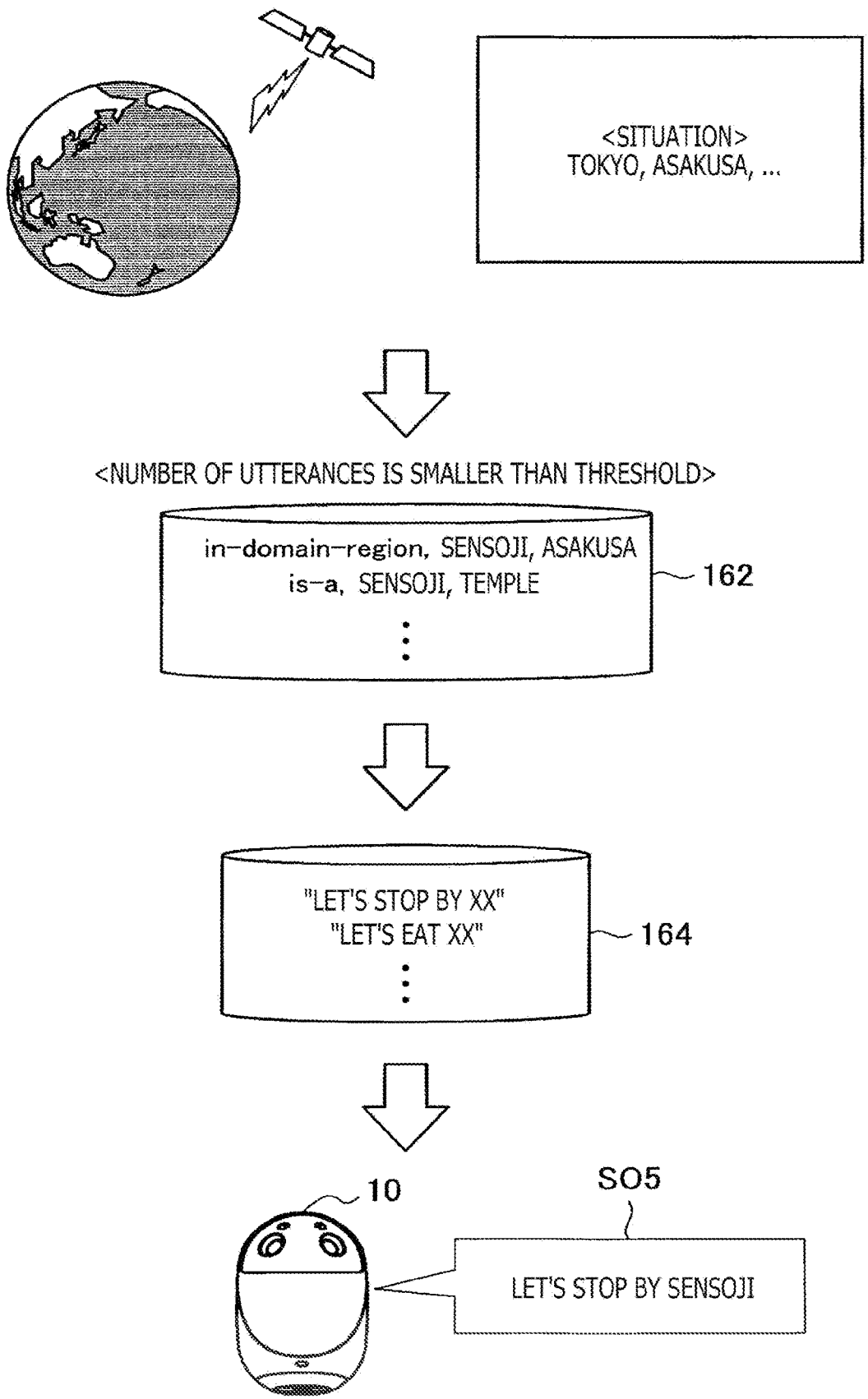
FIG. 10 is a diagram illustrating an example of utterance control exercised on the basis of location information according to the embodiment.

Further, FIG. 10 is a diagram illustrating an example of utterance control that is exercised on the basis of location information according to the present embodiment. In the example depicted in FIG. 10, the recognition section 140 acquires related words ("Tokyo" and "Asakusa") on the basis of the location information.

In the above case, the control section 150 according to the present embodiment accesses the knowledge DB 162, and acquires knowledge elements that are related to the result of environment recognition and used for utterance by a smaller number of times than the threshold. Also, the control section 150 acquires an utterance template from the template DB 164, and determines the contents of an utterance by applying the knowledge elements acquired as mentioned above to the variable section of the utterance template.

When control is exercised as described above in a situation where the user and the information processing apparatus 10 are in Asakusa, Tokyo, as depicted in FIG. 10, it is possible to output, for example, a system utterance SO5 "Let's stop by Sensoji," and provide a more natural conversation according to the peripheral location.

Figure 11:
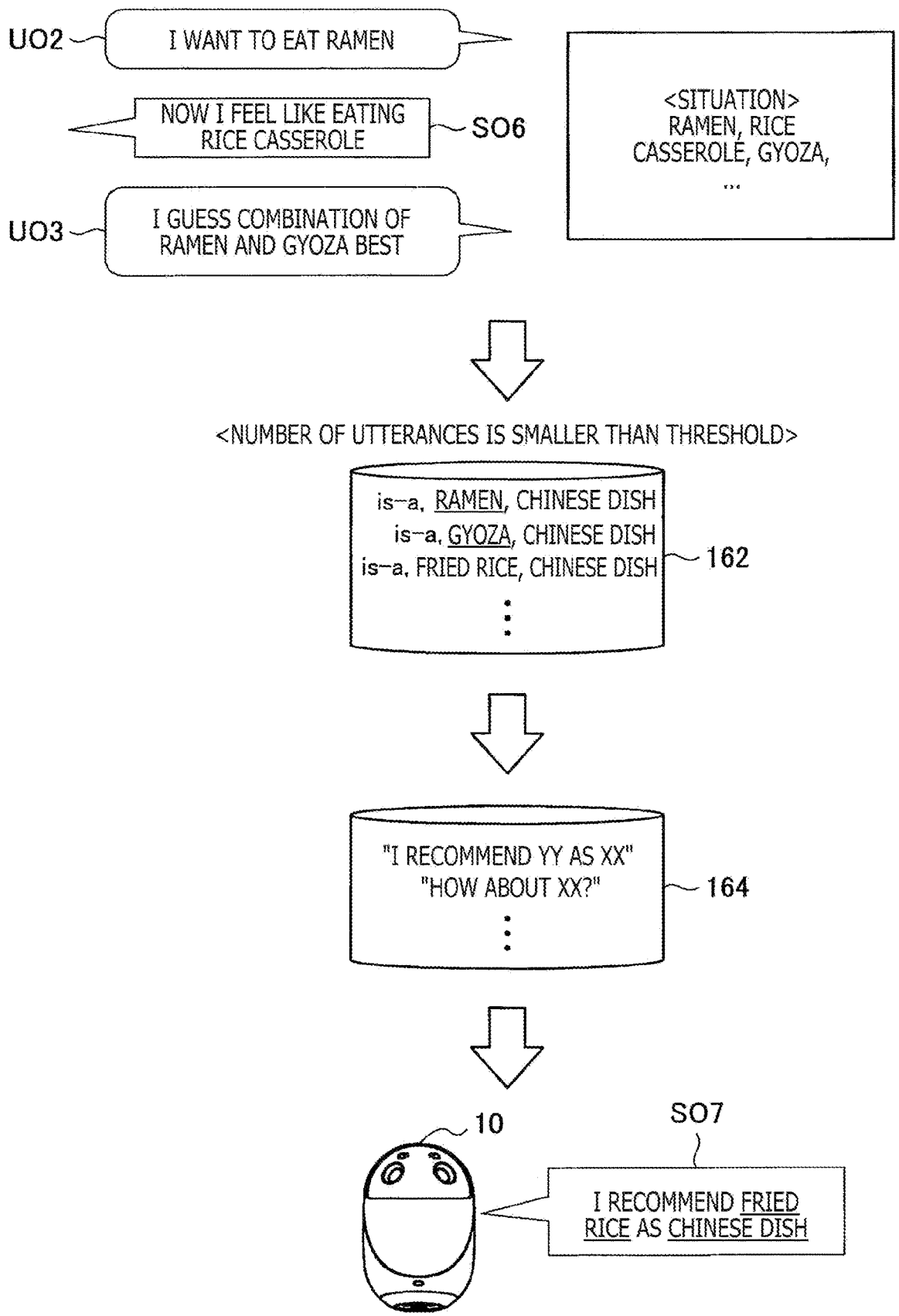
FIG. 11 is a diagram illustrating an example of utterance control exercised on the basis of a conversation history according to the embodiment.

Moreover, FIG. 11 is a diagram illustrating an example of utterance control exercised on the basis of a conversation history according to the present embodiment. Acquired in the example depicted in FIG. 11 are the speech recognition result of a history of conversations with the user (utterance UO2, system utterance SO6, and utterance UO3) and the result of meaning analysis.

In the above case, the control section 150 according to the present embodiment accesses the knowledge DB 162, and acquires knowledge elements that are related to the above results of recognition and used for utterance by a smaller number of times than the threshold. Further, the control section 150 acquires an utterance template from the template DB 164, and determines the contents of an utterance by applying the knowledge elements acquired as mentioned above to the variable section of the utterance template.

When control is exercised as described above, it is possible to output, for example, a system utterance SO7 "I recommend fried rice as a Chinese dish," on the basis of the history of a conversation with the user who has said that the user wants to eat ramen and provide a more natural conversation based on the context.

The specific examples of utterance control exercised based on a recognized situation according to the present embodiment have been described above. It should be noted that the recognized situation according to the present embodiment is not limited to such examples, and may be, for example, the state of the user or time. For example, if a situation where the user has a sleepy look is recognized, the control section 150 is able to cause the voice output section 170 to output an utterance including knowledge regarding sleep and health. Further, the control section 150 is able to output an utterance according to a time zone, for example, by causing the voice output section 170 to output an utterance including knowledge regarding trendy dishes and restaurants at the time of dinner.

Figure 12:
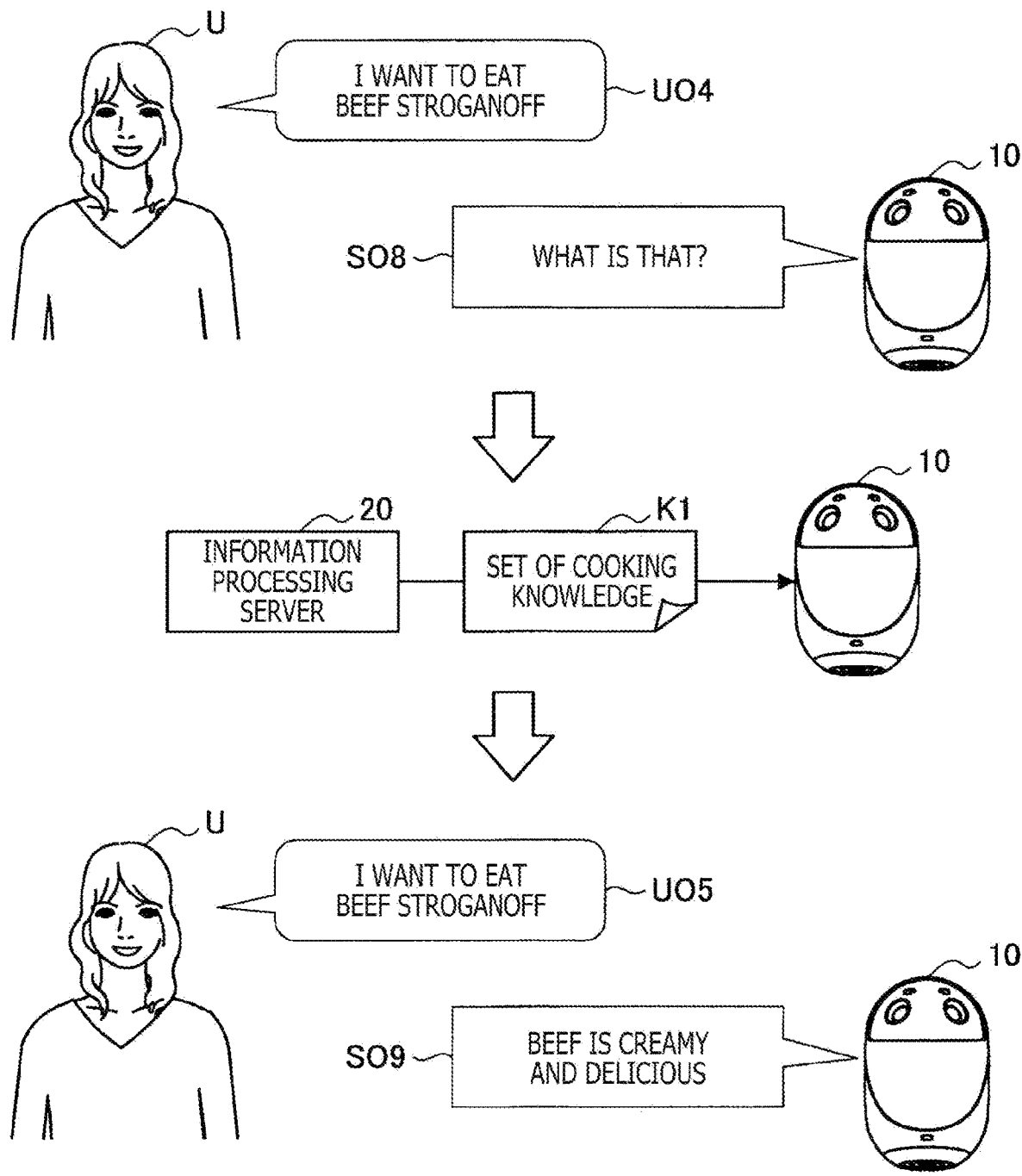
FIG. 12 is a diagram illustrating an effect of knowledge set addition according to the embodiment.

Adding a knowledge set according to the present embodiment will now be described in detail. As mentioned earlier, the information processing apparatus 10 according to the present embodiment is able to add a new knowledge set on the basis of a user operation. FIG. 12 is a diagram illustrating an effect of knowledge set addition according to the present embodiment.

For example, in the upper part of FIG. 12, the user U gives an utterance UO4 by saying, "I want to eat beef stroganoff." In this instance, in a case where the information processing apparatus 10 does not have a knowledge set regarding dishes including beef stroganoff, the information processing apparatus 10 is merely able to output a system utterance SO8 "What is that?" or a stylized response such as "I don't know" or "According to website information."

Meanwhile, in a case where a cooking knowledge set K1 including the knowledge regarding beef stroganoff is newly downloaded from the information processing server 20 (external apparatus) to the information processing apparatus 10 as depicted in the middle part of FIG. 12, the information processing apparatus 10 is able to utilize knowledge elements included in the cooking knowledge set K1 and output, for example, a system utterance SO9 "Beef is creamy and delicious" as depicted in the lower part of FIG. 12.

As described above, the information processing apparatus 10 according to the present embodiment is able to increase the number of variations of system utterances and provide richer conversations with the user by adding a new knowledge set, depending on needs and preferences of the user.

Figure 13:
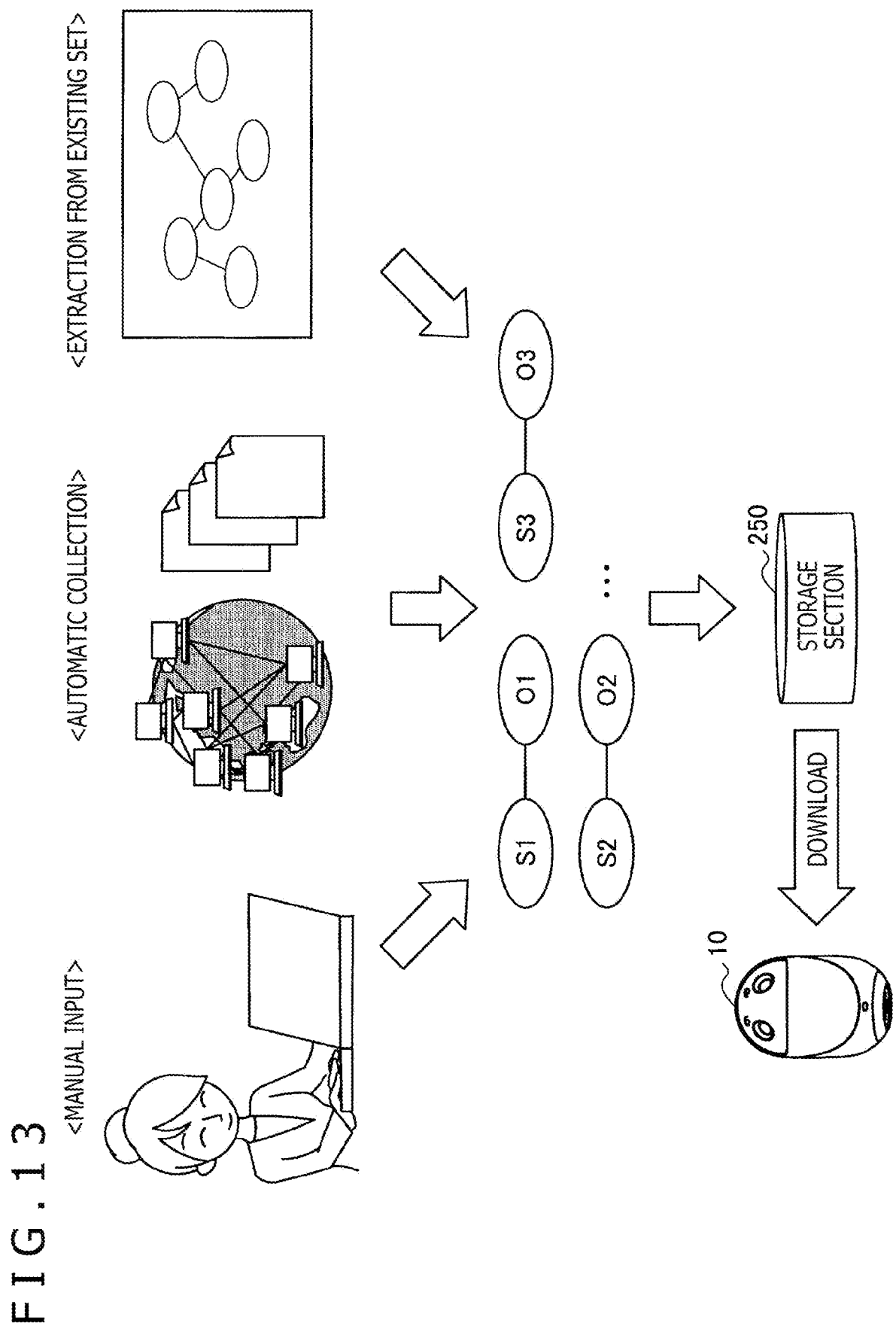
FIG. 13 is a diagram illustrating how to generate a knowledge set according to the embodiment.

FIG. 13 is a diagram illustrating how to generate a knowledge set according to the present embodiment. The knowledge generation section 240 of the information processing server 20 according to the present embodiment may generate a knowledge set by allowing, for example, the user or an operator to manually input knowledge, automatically collecting knowledge, for example, from a website, a document, or the like, or preparing knowledge by extracting or excerpting it from an existing knowledge set, and then by converting such knowledge to a knowledge representation through the use of an RDF structure or other ontology structure. Further, the knowledge generation section 240 makes the generated knowledge set downloadable to the information processing apparatus 10 by storing the generated knowledge set in the storage section 250.

FIG. 14 is a diagram illustrating knowledge set generation based on manual input according to the present embodiment. As mentioned earlier, the knowledge sets according to the present embodiment may be described by the user. For example, as depicted in the upper part of FIG. 14, the user may be able to intuitively and easily generate a new knowledge set, for example, by joining a plurality of inputted knowledge elements and selecting a relation between the joined knowledge elements through the use of a user interface (GUI) displayed on the information processing terminal 30.

Further, as depicted in the lower part of FIG. 14, the user and the operator may also be able to efficiently generate a knowledge set including a large amount of knowledge, for example, by describing knowledge elements and relations in a CSV file or the like according to a predetermined syntax. It should be noted that an example of a knowledge set regarding basic mathematical knowledge is described under <2. Example of Knowledge Set Description>.

Knowledge set generation based on automatic collection according to the present embodiment will now be described in more detail. The knowledge generation section 240 according to the present embodiment is also able to automatically generate a knowledge set, for example, by scraping a resource on a website or performing text mining from an existing document.

In the above case, it is relatively difficult to collect entire knowledge in every field or extract knowledge from documents in various formats. However, establishing an automatic collection rule by limiting the domains and information sources makes it possible to achieve automatic collection of knowledge.

For example, in a case where the domain is limited to cooking, the knowledge to be collected can be limited to recipes, cooking materials, cooking categories, and the like. Further, when a specific recipe site is used as an information source, the problem to be addressed can be simply solved by establishing the rule of acquisition from a unified format in which the recipes, cooking materials, cooking categories, and the like are described.

Knowledge set generation according to the present embodiment has been described above. The user is able to add a knowledge set to the information processing apparatus 10 by downloading the knowledge set generated in the above-described manner from the user interface. It should be noted that the user may be enabled in the above instance to visually confirm the contents of the knowledge set displayed in a format depicted in the upper part of FIG. 14, for example, by pressing a details button.

Figure 15:
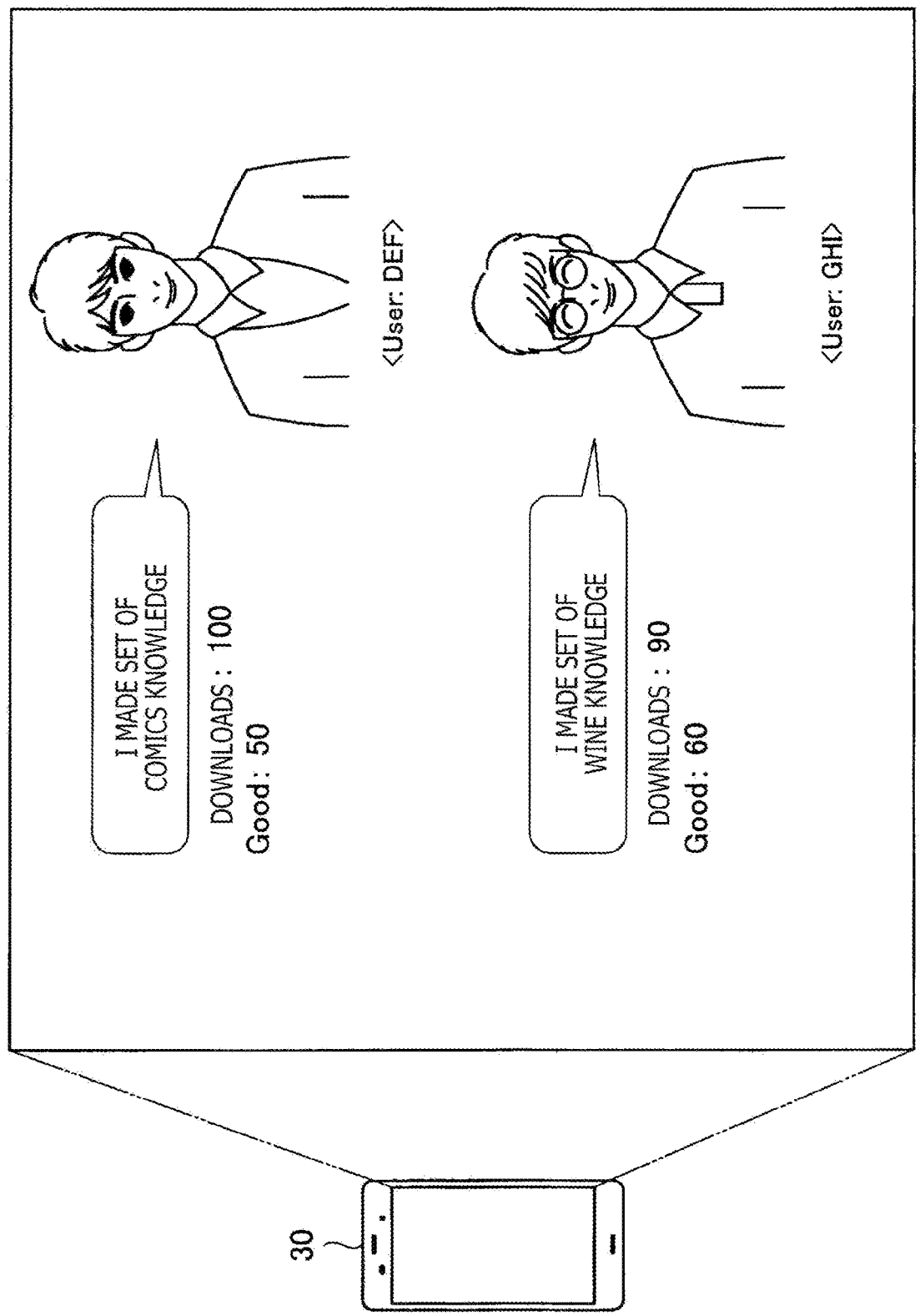
FIG. 15 is a diagram illustrating share of knowledge sets according to the embodiment.

Further, for example, a knowledge set personally generated by the user may be published on the user interface and shared. FIG. 15 is a diagram illustrating the share of knowledge sets according to the present embodiment. The example in FIG. 15 depicts a case where a comics knowledge set generated by a user DEF and a wine knowledge set generated by a user GHI are published, on the user interface.

As described above, the user interface according to the present embodiment makes it possible to make a user-generated knowledge set sharable free of charge or for a fee and to download a knowledge set generated by another user into the information processing apparatus 10 owned by the user.

A function of recommending the addition of a knowledge set according to the present embodiment will now be described. The control section 150 according to the present embodiment may have the function of recommending the addition of knowledge that is predicted to be insufficient for a conversation with the user to the user. FIG. 16 is a diagram illustrating the function of recommending the addition of a knowledge set according to the present embodiment.

In the example depicted in FIG. 16, users U1 and U2 are having a conversation including an utterance UO6 related to "Piano." In a case where a knowledge set in a "Piano" knowledge domain is not installed in the information processing apparatus 10 in the above instance, the control section 150 is able to cause the voice output section 170 to output a system utterance SO10 for recommending the purchase of a knowledge set in a knowledge domain "Musical instruments."

As described above, on the basis of a vocabulary included in an utterance of the user, the control section 150 according to the present embodiment may determine the contents of an utterance for recommending the addition of a knowledge set related to the vocabulary, and cause the voice output section 170 to output a voice corresponding to the determined contents of the utterance.

The above-described function of the control section 150 according to the present embodiment enables the user to understand a knowledge set for having a richer conversation, and makes it possible to obtain an increased revenue by inducing the user to purchase the knowledge set.

Setting the usage priority of knowledge sets according to the present embodiment will now be described. The usage priority of the knowledge sets according to the present embodiment may be settable by the user. FIG. 17 is a diagram illustrating how to set the usage priority of the knowledge sets according to the present embodiment.

As depicted in the upper part of FIG. 17, the user may be enabled to set the usage priority with ease, for example, by dragging and dropping the knowledge sets in the user interface displayed on the information processing terminal 30.

In the above case, the control section 150 according to the present embodiment determines the knowledge set for acquiring knowledge elements according to the set usage priority, and determines the contents of an utterance on the basis of the acquired knowledge elements and an utterance template.

For example, in a case where the user U has set the priority of a knowledge set in a knowledge domain "Animals" higher than the priority of a knowledge set in a knowledge domain "Mythology," the control section 150 according to the present embodiment is able to cause the voice output section 170 to output a system utterance SO11a "Afraid of poison" by collecting knowledge elements related to a word "Scorpion" included in an utterance UO7 of the user U from the knowledge set in the knowledge domain "Animals."

Meanwhile, in a case where the user U has set the priority of the knowledge set in the knowledge domain "Mythology" higher than the priority of the knowledge set in the knowledge domain "Animals," the control section 150 according to the present embodiment is able to cause the voice output section 170 to output a system utterance SO11b "Orion's natural enemy" by collecting knowledge elements related to the word "Scorpion" included in the utterance UO7 of the user U from the knowledge set in the knowledge domain "Mythology."

As described above, the information processing apparatus 10 according to the present embodiment is able to provide a conversation more suited to user preferences by generating the contents of an utterance according to the usage priority of a plurality of knowledge sets.

Utterance control provided by allowing the control section 150 according to the present embodiment to use the knowledge sets and an utterance template has been described above. Exercising the above-described control makes it possible to provide a more flexible and natural conversation, depending on the situation and user preferences and needs.

An example application of technical ideas according to the present embodiment will now be described. The technical ideas according to the present embodiment can be applied not only to a free conversation with the user, but also to various fields. The technical ideas according to the present embodiment may be applied, for example, to advertisements to be issued by companies or the like.

Figure 18:
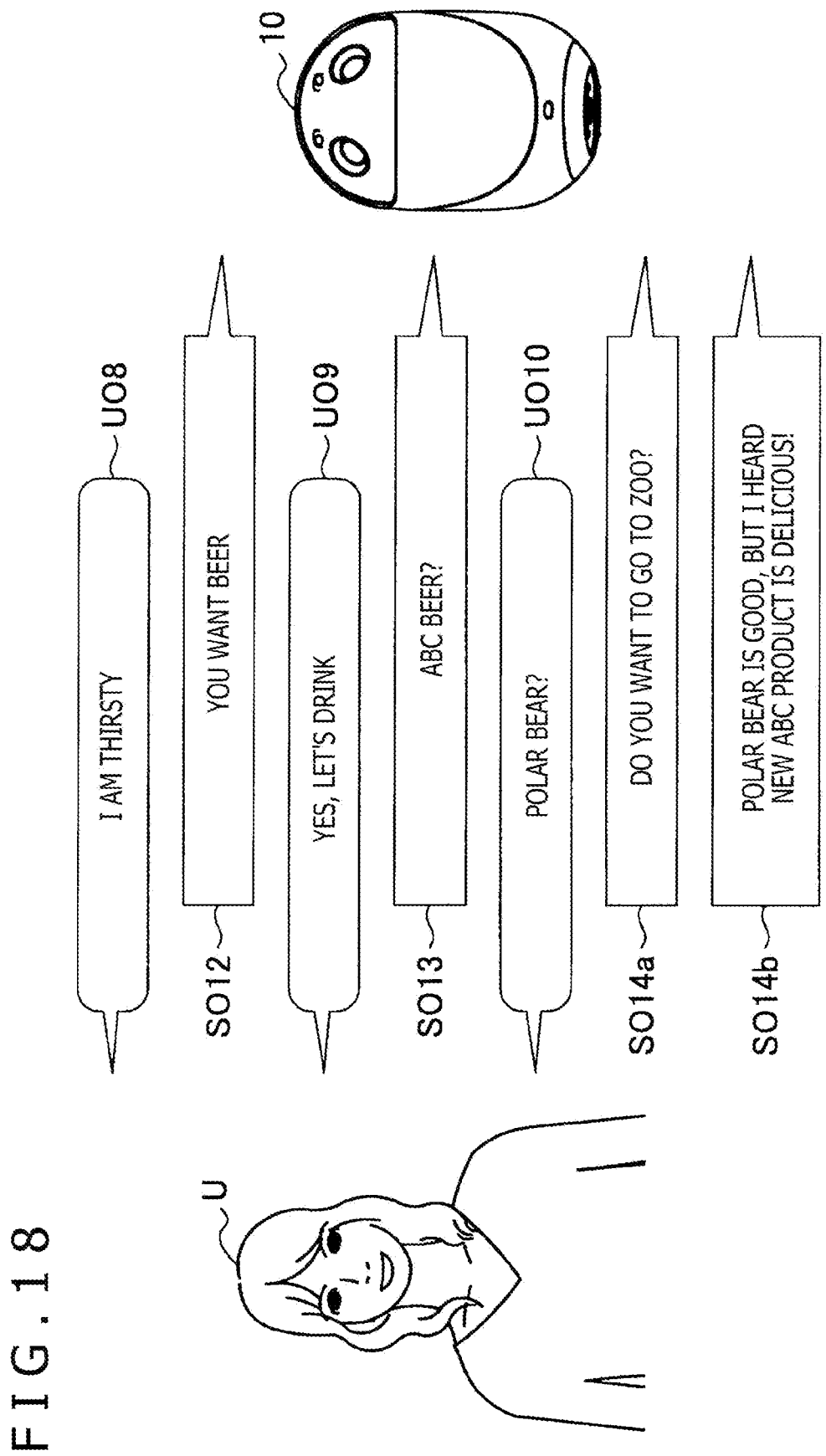
FIG. 18 is a diagram illustrating how technical ideas according to the embodiment are applied to advertisements.

FIG. 18 is a diagram illustrating how technical ideas according to the present embodiment are applied to advertisements. In the example depicted in FIG. 18, the user U and the information processing apparatus 10 are having a conversation on beer. More specifically, the information processing apparatus 10 gives a system utterance SO12 "You want beer" in response to an utterance UO8 "I am thirsty" of the user U and gives a system utterance SO13 for recommending advertised "ABC beer" in response to an utterance UO9 "Yes, let's drink."

As described above, the knowledge sets according to the present embodiment may include a knowledge set regarding an advertisement issued, for example, by a company or the like. In such a case, the control section 150 according to the present embodiment is able to recommend an advertised product or service to the user by acquiring knowledge elements from advertisement-related words (e.g., thirsty and beer) recorded in the history of a conversation with the user and the knowledge set regarding the advertisement, and determining the contents of an utterance.

It should be noted that the knowledge set regarding the advertisement may include, for example, knowledge elements related to a product of a competing company. For instance, in the example depicted in FIG. 18, the user U gives an utterance UO10 including "Polar bear" in response to a system utterance SO13. In this instance, "Polar bear" is assumed to be the name of a product of such a competing company (or a competing beer manufacturer).

Here, in a case where knowledge elements corresponding to "Polar bear" do not exist in the knowledge set regarding the advertisement, the control section 150 might cause the voice output section 170 to output a system utterance SO14a such as "Do you want to go to a zoo?" according to knowledge elements acquired from a knowledge domain "Animals," common sense, and the like. This results in an unnatural conversation.

Meanwhile, in a case where a knowledge element "Polar bear" is included in the knowledge set regarding the advertisement, the control section 150 is able to determine that the user U intends to purchase the product of the competing company. This makes it possible to cause the voice output section 170 to output a system utterance SO14b for recommending a new product of the subject advertisement company.

As described above, applying the technical ideas according to the present embodiment to advertisements makes it possible to recommend an advertised product or service to the user during a natural conversation. As a result, it is expected that the revenue will effectively increase.

The flow of control exercised in a case where the technical ideas according to the present embodiment are applied to advertisements will now be described with reference to FIG. 19.

Figure 19:
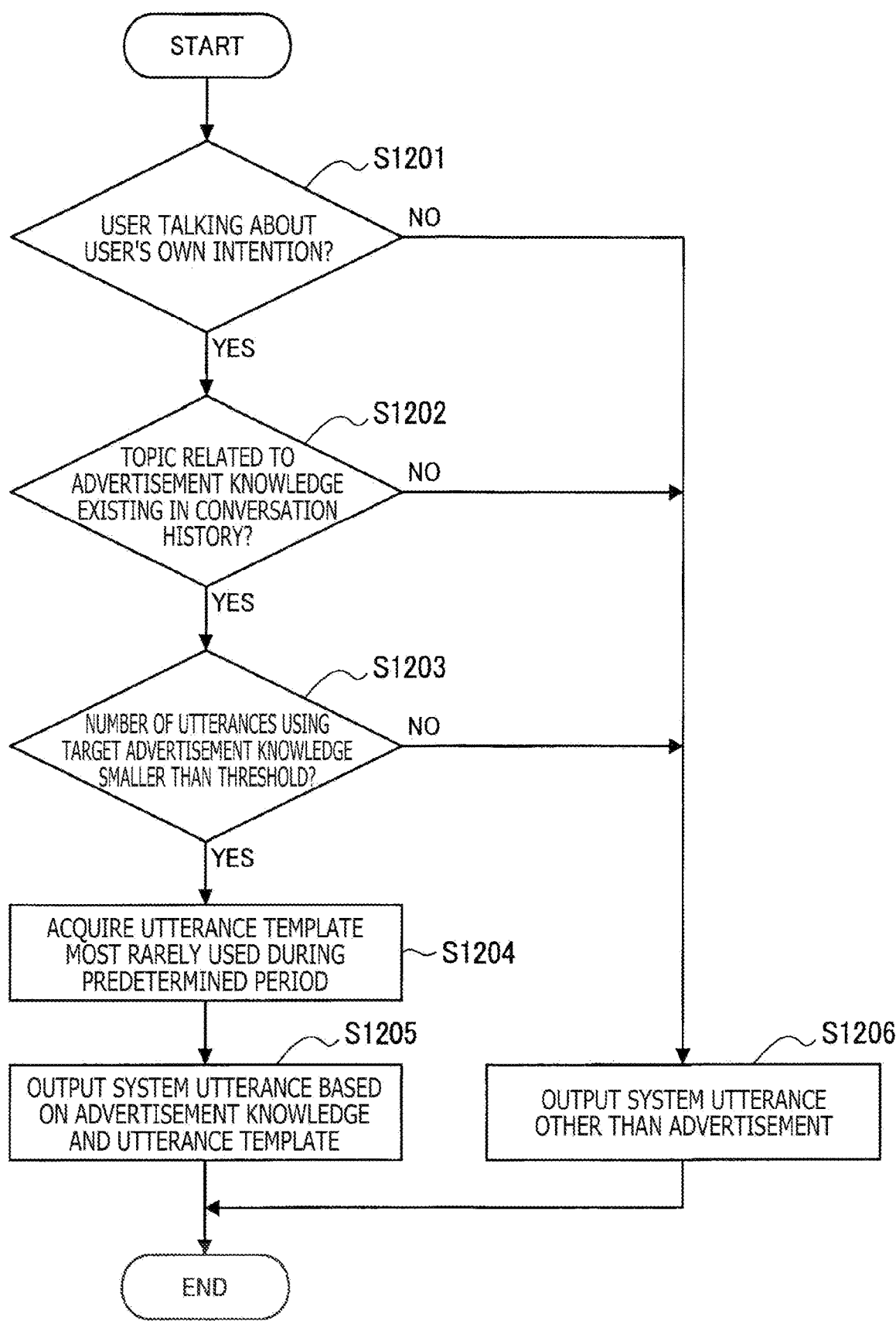
FIG. 19 is a flowchart illustrating how control is exercised in a case where the technical ideas according to the embodiment are applied to advertisements.

Referring to FIG. 19, first, the control section 150 determines whether or not the user is talking about the user's own intention (S1201).

Here, in a case where it is determined that the user is not talking about the user's own intention ("NO" at step S1201), the control section 150 sets the contents of an utterance other than an advertisement, and causes the voice output section 170 to output a system utterance corresponding to the set contents of the utterance (step S1206).

Meanwhile, in a case where it is determined that the user is talking about the user's own intention ("YES" at step S1201), the control section 150 determines whether or not a topic related to advertisement knowledge (knowledge elements included in a knowledge set regarding the advertisement) exists in the conversation history (step S1202).

Here, in a case where the topic related to the advertisement knowledge does not exist in the conversation history ("NO" at step S1202), the control section 150 sets the contents of an utterance other than the advertisement, and causes the voice output section 170 to output a system utterance corresponding to the set contents of the utterance (step S1206).

Meanwhile, in a case where the topic related to the advertisement knowledge exists in the conversation history ("YES" at step S1202), the control section 150 proceeds to determine whether the number of utterances using target advertisement knowledge is smaller than a threshold (step S1203).

Here, in a case where the number of utterances using the target advertisement knowledge is equal to or greater than the threshold ("NO" at step S1203), the control section 150 sets the contents of an utterance other than the advertisement, and causes the voice output section 170 to output a system utterance corresponding to the set contents of the utterance (step S1206).

Meanwhile, in a case where the number of utterances using the target advertisement knowledge is smaller than the threshold ("YES" at step S1203), the control section 150 acquires an utterance template that is most rarely used during a predetermined period (step S1204). It should be noted that, in the above instance, product features, slogans, or the like may be incorporated in the utterance template.

Next, the control section 150 determines the contents of an utterance on the basis of the advertisement knowledge and the utterance template, and causes the voice output section 170 to output a system utterance corresponding to the determined contents of the utterance (step S1205).

The flow of control exercised in the case where the technical ideas according to the present embodiment are applied to advertisements has been described above. Exercising the above-described control makes it possible to prevent the same advertisement knowledge and utterance template from being frequently used in the predetermined period, and to avoid annoying the user.

Further, the control section 150 according to the present embodiment is also able to cause the voice output section 170 to output a system utterance using the advertisement knowledge only in a case where the user gives an utterance such as "Which one should I select?" or "What should I select?" in order to request a proposal.

Furthermore, an unpopular part of a product can be daringly incorporated in the utterance template to create the attitude of a third person (e.g., "ABC's TV sets are expensive but excellent in image quality" etc.) and thus provide a more natural conversation.

It should be noted that the technical ideas according to the present embodiment are widely applicable to various fields including the field of advertisements. The technical ideas according to the present embodiment may be applied to education, for example. In such a case, an education system can be implemented through the information processing apparatus 10 by installing knowledge sets corresponding to various education courses such as mathematics, national language, science, and social studies.

Further, the technical ideas according to the present embodiment may be applied, for example, to sales promotion and publicity. In such a case, it is also conceivable that free-of-charge knowledge sets may be created and distributed by a third party in order to promote a product of the third party or the like.

Furthermore, the technical ideas according to the present embodiment may be applied, for example, to rehabilitation or the like. In such a case, language-impaired users can be rehabilitated to be able to have a normal conversation by installing, for example, knowledge sets of easy-to-use linguistic expressions for daily life in the information processing apparatus 10.

Moreover, the technical ideas according to the present embodiment may be applied, for example, to someone to talk to about hobbies or the like. In such a case, the user is able to enjoy a deeper conversation by installing rare expert knowledge necessary for a conversation with the user and a knowledge set regarding personal information regarding personal relations or the like.

2. Example of Knowledge Set Description

Figure 20:
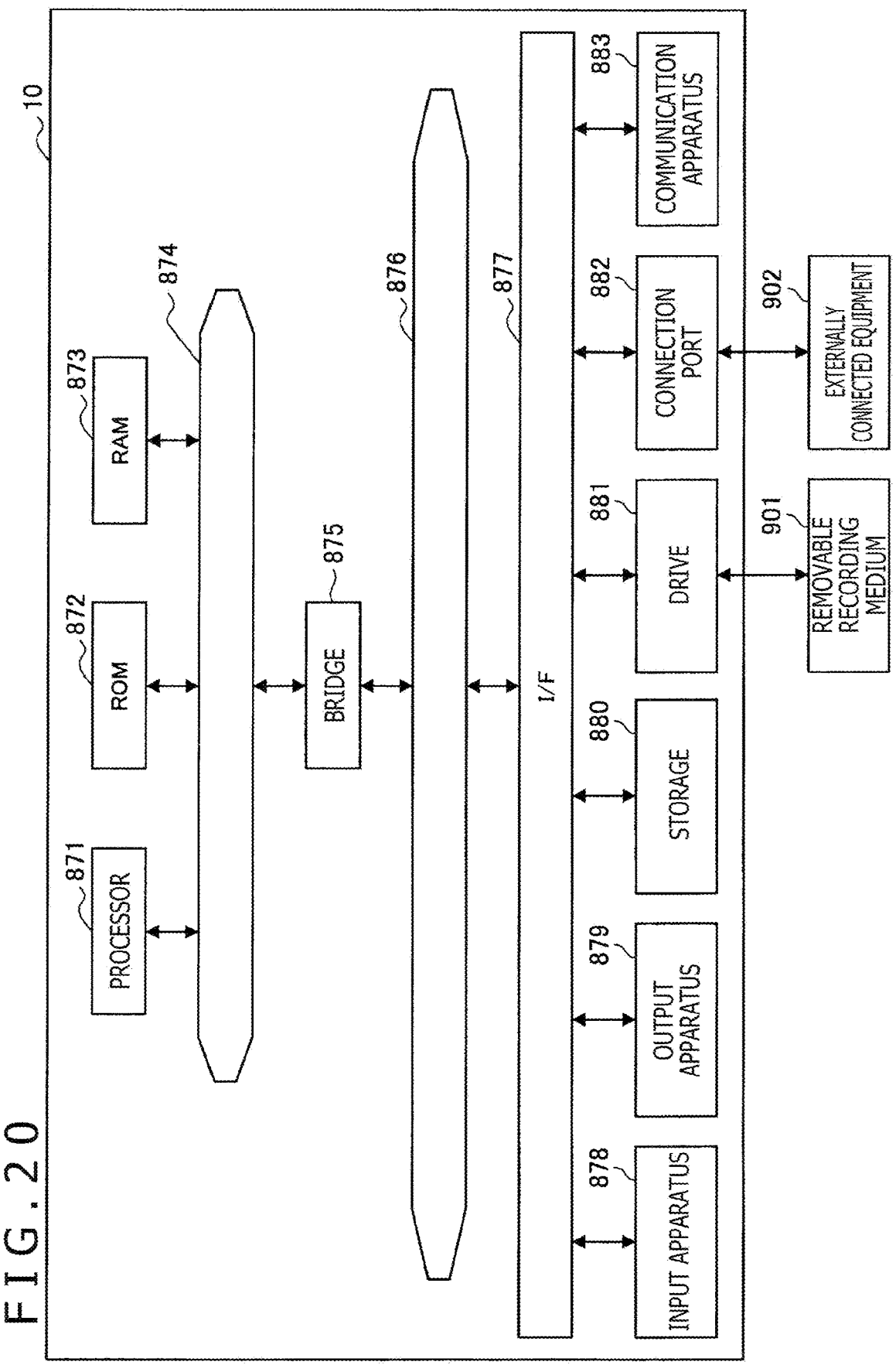
FIG. 20 is a diagram illustrating an example hardware configuration according to an embodiment of the present disclosure.

An example of knowledge set description of the basics of mathematics is illustrated below.
$is-a, Cantor, human
$is-a, Kronecker, human
$is-a, Russell, human
$is-a, Whitehead, human
$is-a, Hilbert, human
$is-a, Gödel, human
$is-a, Gentzen, human
$is-a, Brouwer, human
$is-a, Frege, human
$is-a, Zermelo, human
$is-a, Fraenkel, human
$is-a, Euler, human
$is-a, Gauss, human
$is-a, Euclid, human
$is-a, Cantor, mathematician
$is-a, Kronecker, mathematician
$is-a, Russell, mathematician
$is-a, Whitehead, mathematician
$is-a, Hilbert, mathematician
$is-a, Gödel, mathematician
$is-a, Gentzen, mathematician
$is-a, Brouwer, mathematician $is-a, Frege, mathematician
$is-a, Zermelo, mathematician
$is-a, Fraenkel, mathematician
$is-a, Euler, mathematician
$is-a, Gauss, mathematician
$is-a, Euclid, mathematician
$is-a, Cantor, male
$is-a, Kronecker, male
$is-a, Russell, male
$is-a, Whitehead, male
$is-a, Hilbert, male
is-a, Gödel, male
$is-a, Gentzen, male
$is-a, Brouwer, male
$is-a, Frege, male
$is-a, logic, theory
$is-a, propositional logic, logic
$is-a, propositional logic, logical system
$is-a, predicate logic, logic
$is-a, predicate logic, logical system
$has-a, logical system, logical operation
$is-a, proposition, literal
$is-a, logical operator, operator
$is-a, entailment, logical operation
$is-a, negation, logical operation
$is-a, logical disjunction, logical operation
$is-a, logical conjunction, logical operation
$is-a, exclusive disjunction, logical operation
$is-a, equivalence, logical operation
$is-a, tautology, logical operation
$is-a, deduction, logical operation
$is-a, deduction, inference
$is-a, first-order predicate logic, predicate logic
$is-a, second-order predicate logic, predicate logic
$is-a, second-order predicate logic, high-order predicate logic
$is-a, high-order predicate logic, high-order logic
$derive, axiom, theorem
$is-a, syllogism, deduction
$is-a, syllogism, deduction
$is-a, theorem, logical consequence
$is-a, logical consequence, correct
$is-a, derivation, logical operation
$is-a, axiomatic set theory, set theory
$is-a, naive set theory, set theory
$is-a, logical formula, formula
$is-a, integer logical formula, logical formula
$is-a, primitive formula, logical formula
$is-a, primitive formula, formula
$is-a, predicate logical formula, logical formula
$is-a, propositional logical formula, logical formula
$part-of, predicate, literal
$part-of, literal, predicate logical formula
$part-of, logical operator, predicate logical formula
$part-of, logical operator, propositional logical formula
$part-of, proposition, propositional logical formula
$part-of, formula, propositional logical formula
$part-of, logical operator, logical formula
$member-of, axiom, axiomatic system
$has-a, axiomatic system, axiom
$is-a, axiomatic set theory, axiomatic system
$member-of, Russell, logicism
$member-of, Brouwer, intuitionism
$member-of, Hilbert, formalism
$is-a, classical logic, logic
$has-a, classical logic, law of excluded middle
$has-a, formalistic logic, law of excluded middle
$author, Principia Mathematica
$author, Elements, Euclid
$is-a, equation, tautology
$is-a, equation, formula
$is-a, tautology, formula
$has-a, axiomatic system, axiom
$is-a, Zermelo-Fraenkel axiomatic system, axiomatic set theory
$is-a, Zermelo-Fraenkel axiomatic system, axiomatic system
$has-a, Zermelo-Fraenkel axiomatic system, axiom of extensionality
$has-a, Zermelo-Fraenkel axiomatic system, axiom of empty set
$has-a, Zermelo-Fraenkel axiomatic system, axiom of pairing
$has-a, Zermelo-Fraenkel axiomatic system, axiom of union
$has-a, Zermelo-Fraenkel axiomatic system, axiom of infinity
$has-a, Zermelo-Fraenkel axiomatic system, axiom of power set
$has-a, Zermelo-Fraenkel axiomatic system, axiom of substitution
$has-a, Zermelo-Fraenkel axiomatic system, axiom of regularity
$is-a, ZFC, axiomatic set theory
$is-a, ZFC, axiomatic system
$has-a, ZFC, axiom of extensionality
$has-a, ZFC, axiom of empty set
$has-a, ZFC, axiom of pairing
$has-a, ZFC, axiom of union
$has-a, ZFC, axiom of infinity
$has-a, ZFC, axiom of power set
$has-a, ZFC, axiom of substitution
$has-a, ZFC, axiom of regularity
$has-a, ZFC, axiom of choice
$is-a, Russell's paradox, paradox
$is-a, Grothendieck universe, set
$is-a, metric space, set
$has-a, metric space, distance function
$is-a, Manhattan distance, distance
$is-a, edit distance, distance
$is-a, Mahalanobis distance, distance
$is-a, Euclidean distance, distance
$is-a, cosine distance, distance
$is-a, hamming distance, distance
$satisfy, distance, triangle inequality
$has-a, distance, non-negativity
$is-a, function, mapping
$has-a, function, range
$has-a, function, domain of definition
$has-a, bijection, inverse function
$is-a, surjection, function
$is-a, injection, function
$is-a, bijection, function
$is-a, algebraic function, function
$is-a, elementary function, function
$is-a, exponential function, function
$is-a, logarithmic function, function
$is-a, trigonometric function, function
$is-a, inverse trigonometric function, function
$is-a, hyperbolic function, function
$is-a, inverse trigonometric function, function
$is-a, gamma function, function
$is-a, beta function, function
$is-a, error function, function $is-a, theta function, function
$is-a, zeta function, function
$is-a, Mathieu function, function
$is-a, even function, function
$is-a, odd function, function
$is-a, natural number, number
$is-a, natural number, integer
$is-a, natural number, rational number
$is-a, natural number, real number
$is-a, integer, number
$is-a, integer, rational number
$is-a, integer, real number
$is-a, rational number, number
$is-a, rational number, real number
$is-a, irrational number, number
$is-a, real number, number
$is-a, transcendental number, number
$is-a, prime number, number
$is-a, prime number, natural number
$is-a, prime number, rational number
$is-a, prime number, real number
$is-a, complex number, number
$has-a, complex number, imaginary number
$part-of, imaginary number, complex number
$is-a, imaginary number, number
$has-a, imaginary number, complex number
$has-a, power set, bundle structure
$is-a, power set, set
$is-a, Cartesian product, set
$is-a, infinite set, set
$is-a, finite set, set
$is-a, countable set, set
$has-a, countable set, countability
$is-a, non-countable set, set
$has-a, set, concentration
$is-a, real number, set
$is-a, real number, cardinality of the continuum
$is-a, union, set
$is-a, ordered set, set
$has-a, ordered set, order relation
$is-a, order relation, binary relation
$is-a, binary relation, relation
$is-a, partial order, binary relation
$has-a, partial order, transitivity
$has-a, partial order, reflexivity
$has-a, partial order, antisymmetry
$satisfy, partial order, transitivity rule
$satisfy, partial order, reflexivity rule
$satisfy, partial order, antisymmetry rule
$is-a, total order, binary relation
$has-a, total order, transitivity
$has-a, total order, reflexivity
$has-a, total order, antisymmetry
$satisfy, total order, transitivity rule
$satisfy, total order, reflexivity rule
$satisfy, total order, antisymmetry rule
$is-a, partially-ordered set, ordered set
$is-a, totally-ordered set, ordered set
$has-a, partially-ordered set, partial order
$has-a, totally-ordered set, total order
$is-a, sum, operation
$member-of, sum, four arithmetic operations,
$is-a, difference, operation
$member-of, difference, four arithmetic operations
$is-a, product, operation
$member-of, product, four arithmetic operations
$is-a, quotient, operation
$member-of, quotient, four arithmetic operations
$is-a, addition, operation
$member-of, addition, four arithmetic operations
$is-a, subtraction, operation
$member-of, subtraction, four arithmetic operations
$is-a, multiplication, operation
$member-of, multiplication, four arithmetic operations
$is-a, division, operation
$member-of, division, four arithmetic operations
$member-of, algebra, mathematics
$member-of, geometry, mathematics
$member-of, analysis, mathematics
$member-of, calculus, mathematics
$member-of, logic, mathematics
$member-of, foundations of mathematics, mathematics
$member-of, topology, mathematics
$has-a, Russell, Russell's paradox
$has-a, Gödel, Gödel's incompleteness theorems
$has-a, Gödel, Gödel's completeness theorem
$has-a, Hilbert, Hilbert's 23 problems
$has-a, Russell, type theory
$has-a, Cantor, naive set theory
$has-a, Cantor, continuum hypothesis
$has-a, Zermelo, Zermelo-Fraenkel axiomatic system
$has-a, Fraenkel, Zermelo-Fraenkel axiomatic system
$has-a, Zermelo, ZFC
$has-a, Fraenkel, ZFC 3. Example Hardware Configuration An example hardware configuration of the information processing apparatus 10 according to an embodiment of the present disclosure will now be described. FIG. 20 is a block diagram illustrating an example hardware configuration of the information processing apparatus 10 according to an embodiment of the present disclosure. As depicted in FIG. 20, the information processing apparatus 10 includes, for example, a processor 871, a ROM 872, a RAM 873, a host bus 874, a bridge 875, an external bus 876, an interface 877, an input apparatus 878, an output apparatus 879, a storage 880, a drive 881, a connection port 882, and a communication apparatus 883. It should be noted that the hardware configuration depicted in FIG. 20 is merely an example, and that some of the components may also be omitted from the configuration. Further, the configuration may further include components other than those depicted in FIG. 20.

(Processor 871)

The processor 871 functions, for example, as an arithmetic processing unit or a control apparatus, and controls the whole or part of the operation of each component according to various types of programs recorded in the ROM 872, the RAM 873, the storage 880, or a removable recording medium 901.

(ROM 872 and RAM 873)

The ROM 872 is means of storing programs to be loaded into the processor 871 and data used for computation, or the like. The RAM 873 temporarily or permanently stores the programs to be loaded into the processor 871 and various types of parameters that vary as appropriate when the programs are executed, or the like.

(Host Bus 874, Bridge 875, External Bus 876, and Interface 877)

The processor 871, the ROM 872, and the RAM 873 are interconnected through the host bus 874 which is capable of transferring data at a high speed, for example. Meanwhile, the host bus 874 is connected to the external bus 876 through the bridge 875, for example. The external bus 876 has a relatively low data transfer rate. Also, the external bus 876 is connected to various components through the interface 877.

(Input Apparatus 878)

The input apparatus 878 include, for example, a mouse, a keyboard, a touch panel, a button, a switch, a lever, or the like. Alternatively, the input apparatus 878 may also include a remote controller that is capable of transmitting a control signal by using infrared or other electromagnetic radiation. Further, the input apparatus 878 includes a voice input apparatus such as a microphone.

(Output Apparatus 879)

The output apparatus 879 is an apparatus capable of visually or audibly notifying the user of acquired information, for example, a display apparatus such as a CRT (Cathode Ray Tube), an LCD, or an organic EL apparatus, an audio output apparatus such as speakers or headphones, a printer, a mobile phone, or a facsimile device. Further, the output apparatus 879 according to the present disclosure includes various vibration devices that are capable of outputting tactile stimuli.

(Storage 880)

The storage 880 is an apparatus for storing various types of data. For example, a magnetic storage device such as a hard disk drive (HDD), a semiconductor storage device, an optical storage device, a magneto-optical storage device, or the like is used as the storage 880.

(Drive 881)

The drive 881 is an apparatus that reads information recorded in the removable recording medium 901 such as a magnetic disk, an optical disk, a magneto-optical disk, or a semiconductor memory, or that writes information into the removable recording medium 901.

(Removable Recording Medium 901)

The removable recording medium 901 is, for example, a DVD medium, a Blu-ray (registered trademark) medium, an HD-DVD medium, various types of semiconductor storage media, or the like. Obviously, the removable recording medium 901 may be, for example, an electronic device or an IC card on which a non-contact IC chip is mounted.

(Connection Port 882)

The connection port 882 is, for example, a USB (Universal Serial Bus) port, an IEEE 1394 port, an SCSI (Small Computer System Interface) port, an RS-232C port, or a port for connecting externally connected equipment 902 such as an optical audio terminal.

(Externally Connected Equipment 902) The externally connected equipment 902 is, for example, a printer, a mobile music player, a digital camera, a digital video camera, an IC recorder, or the like.

(Communication Apparatus 883)

The communication apparatus 883 is a communication device for connecting to a network and is, for example, a communication card for a wired or wireless LAN, Bluetooth (registered trademark) network, or a WUSB (Wireless USB) device, an optical communication router, an ADSL (Asymmetric Digital Subscriber Line) router, or a modem for various types of communications.

4. Conclusion

As described above, the information processing apparatus 10 which implements the information processing method according to an embodiment of the present disclosure includes the control section 150 that controls a conversation with the user according to a recognized situation. Further, one of the features of the control section 150 according to an embodiment of the present disclosure is that the control section 150 acquires knowledge elements related to the recognized situation in terms of knowledge from knowledge sets, and determines the contents of an utterance on the basis of the knowledge elements and an utterance template. Such a configuration makes it possible to provide a more natural conversation with the user on the basis of various knowledge.

While the preferred embodiment of the present disclosure has been described in detail with reference to the accompanying drawings, the technical scope of the present disclosure is not limited to the above-described examples. Persons having general knowledge of the technical field of the present disclosure are obviously able to contemplate various examples of changes and modifications within the category of the technical ideas described in the appended claims. It is to be appreciated that such changes and modifications also fall within the technical scope of the present disclosure.

Further, advantages described in this document are merely explanatory or illustrative, and not restrictive. In other words, in addition to or in place of the above-described advantages, the technique according to the present disclosure is able to provide other advantages that can be easily contemplated from the description in the present specification by a person skilled in the art.

Furthermore, a program can be created for enabling a CPU, a ROM, a RAM, and other hardware built in a computer to exercise functions equivalent to those of the components included in the information processing server 20. Additionally, it is also possible to supply a computer-readable non-transient recording medium on which the program is recorded.

Moreover, the steps of processing performed by the information processing apparatus 10 described in the present specification need not always be chronologically performed in a sequence depicted in the flowcharts. For example, the steps of processing performed by the information processing apparatus 10 may be performed in a sequence different from a sequence depicted in the flowcharts or may be performed in a parallel manner.

It should be noted that the following configurations also fall within the technical scope of the present disclosure.

(1)

An information processing apparatus including:
- a control section that controls a conversation with a user according to a recognized situation,
- in which the control section acquires knowledge elements related to the recognized situation in terms of knowledge from knowledge sets, and determines contents of an utterance on the basis of the knowledge elements and an utterance template.

(2)

The information processing apparatus according to (1) above,
- in which the knowledge elements include at least a vocabulary.

(3)

The information processing apparatus according to (2) above,
- in which the knowledge sets contain description of a plurality of the knowledge elements and description of a relation between the knowledge elements.

(4)

The information processing apparatus according to (3) above, further including:
- a storage section that stores the knowledge sets.

(5)
The information processing apparatus according to (4), in which the knowledge sets are described for each knowledge domain.

(6)
The information processing apparatus according to (5) above,
in which the knowledge sets are addable according to a user operation.

(7)
The information processing apparatus according to (6) above,
in which the knowledge sets are downloadable from an external apparatus.

(8)
The information processing apparatus according to any one of (5) to (7) above,
in which the knowledge sets are describable by a user.

(9)
The information processing apparatus according to any one of (5) to (8) above,
in which a usage priority of the knowledge sets is settable by a user, and
the control section determines the knowledge sets that acquires the knowledge elements according to the usage priority, and determines contents of an utterance on the basis of the acquired knowledge elements and the utterance template.

(10)
The information processing apparatus according to any one of (1) to (9) above,
in which the recognized situation includes at least a history of conversations with a user, and
the control section acquires, from the knowledge sets, the knowledge elements related to a vocabulary included in the history of conversations.

(11)
The information processing apparatus according to (10) above,
in which the control section determines the utterance template corresponding to the intention of a user utterance, and applies the acquired knowledge elements to the determined utterance template.

(12)
The information processing apparatus according to any one of (1) to (11) above,
in which the recognized situation includes at least one of an object recognition result, an environment recognition result, or location information.

(13)
The information processing apparatus according to any one of (1) to (12) above,
in which the control section acquires, from the knowledge sets, the knowledge elements that have been used for utterance by a smaller number of times than a threshold during a predetermined period.

(14)
The information processing apparatus according to any one of (1) to (13) above,
in which the control section selects the utterance template that has been used for utterance by a smaller number of times than a threshold during a predetermined period.

(15)
The information processing apparatus according to any one of (1) to (14) above,
in which the knowledge sets include at least a knowledge set regarding an advertisement, and
the control section acquires the knowledge elements from the knowledge set regarding the advertisement in a case where a vocabulary related to the advertisement is included in the history of conversations with a user.

(16)
The information processing apparatus according to any one of (1) to (15) above,
in which the control section determines, on the basis of a vocabulary included in an utterance of a user, contents of an utterance for recommending addition of the knowledge set related to the vocabulary.

(17)
The information processing apparatus according to any one of (1) to (16) above, further including:
a voice output section that outputs a voice corresponding to contents of an utterance determined by the control section.

(18)
An information processing method including:
controlling, by a processor, a conversation with a user according to a recognized situation, in which the controlling further includes acquiring knowledge elements related to the recognized situation in terms of knowledge from knowledge sets, and determining contents of an utterance on the basis of the knowledge elements and an utterance template.

(19)
A program for causing a computer to function as:
an information processing apparatus that includes a control section that controls a conversation with a user according to a recognized situation,
in which the control section acquires knowledge elements related to the recognized situation in terms of knowledge from knowledge sets, and determines contents of an utterance on the basis of the knowledge elements and an utterance template.

REFERENCE SIGNS LIST

10: Information processing apparatus
140: Recognition section
150: Control section
162: Knowledge DB
164: Template DB
170: Voice output section
20: Information processing server
30: Information processing terminal

The invention claimed is:
1. An information processing apparatus, comprising:
a central processing unit (CPU) configured to:
receive a first utterance of a user;
recognize a situation associated with the user based on the first utterance of the user, wherein the recognized situation includes at least an intention analysis result of the first utterance of the user;
control a conversation with the user based on the recognized situation;
acquire one or more knowledge elements, from a first knowledge set of a plurality of knowledge sets, based on the recognized situation, wherein
the first knowledge set of the plurality of knowledge sets is based on a usage priority associated with the first knowledge set, and
the usage priority is set by the user based on a knowledge domain associated with the first knowledge set;

determine a type of utterance template of a plurality of types of utterance templates based on the intention analysis result of the first utterance of the user;
acquire an utterance template based on the determined type of utterance template;
determine contents of a second utterance based on the one or more knowledge elements and the utterance template; and
output the second utterance to the user.

2. The information processing apparatus according to claim 1, wherein
the one or more knowledge elements include at least a first vocabulary, and
the first vocabulary corresponds to the knowledge domain of a plurality of knowledge domains.

3. The information processing apparatus according to claim 2, wherein the first knowledge set of the plurality of knowledge sets contains a first description of the one or more knowledge elements and a second description of a relation between the one or more knowledge elements.

4. The information processing apparatus according to claim 3, further comprising:
a memory configured to store the plurality of knowledge sets.

5. The information processing apparatus according to claim 1,
wherein the CPU is further configured to add one or more knowledge sets to the plurality of knowledge sets, based on an operation by the user.

6. The information processing apparatus according to claim 5, wherein the CPU is further configured to download the plurality of knowledge sets from a server.

7. The information processing apparatus according to claim 1,
wherein the plurality of knowledge sets is based on a user input.

8. The information processing apparatus according to claim 1,
wherein the recognized situation includes at least a conversation history of the user, and
the CPU is further configured to acquire, from the first knowledge set, the one or more knowledge elements related to a second vocabulary included in the conversation history.

9. The information processing apparatus according to claim 1, wherein the CPU is further configured to:
apply the one or more knowledge elements to the acquired utterance template.

10. The information processing apparatus according to claim 1, wherein the recognized situation further includes at least one of an object recognition result, an environment recognition result, or location information.

11. The information processing apparatus according to claim 1, wherein
the one or more knowledge elements are used in a specific period for the second utterance by a smaller number of times than a first threshold.

12. The information processing apparatus according to claim 1, wherein the utterance template is used for a smaller number of times than a second threshold during a specific period.

13. The information processing apparatus according to claim 1, wherein
the plurality of knowledge sets include a second knowledge set regarding an advertisement, and
the CPU is further configured to:
acquire the one or more knowledge elements from at least one of the second knowledge set or one or more advertisement-related words included in a conversation history of the user.

14. The information processing apparatus according to claim 1, wherein the CPU is further configured to:
determine first contents of a third utterance based on a third vocabulary included in the first utterance of the user; and
recommend to the user, based on the third utterance, addition of a third knowledge set to the plurality of knowledge sets, wherein the third knowledge set is related to the third vocabulary.

15. The information processing apparatus according to claim 1, further comprising:
a speaker configured to output a voice that corresponds to the contents of the second utterance.

16. An information processing method, comprising:
receiving a first utterance of a user;
recognizing a situation associated with the user based on the first utterance of the user, wherein the recognized situation includes at least an intention analysis result of the first utterance of the user;
controlling a conversation with the user based on the recognized situation;
acquiring one or more knowledge elements from a first knowledge set of a plurality of knowledge sets, based on the recognized situation, wherein
the first knowledge set of the plurality of knowledge sets is based on a usage priority associated with the first knowledge set, and
the usage priority is set by the user based on a knowledge domain associated with the first knowledge set;
determining a type of utterance template of a plurality of types of utterance templates based on the intention analysis result of the first utterance of the user;
acquiring an utterance template based on the determined type of utterance template;
determining contents of a second utterance based on the one or more knowledge elements and the utterance template; and
outputting the second utterance to the user.

17. A non-transitory computer-readable medium having stored thereon, computer-executable instructions which, when executed by a computer, cause the computer to execute operations, the operations comprising:
receiving a first utterance of a user;
recognizing a situation associated with the user based on the first utterance of the user, wherein the recognized situation includes at least an intention analysis result of the first utterance of the user;
controlling a conversation with the user based on the recognized situation;
acquiring one or more knowledge elements from a first knowledge set of a plurality of knowledge sets, based on the recognized situation, wherein
the first knowledge set of the plurality of knowledge sets is based on a usage priority associated with the first knowledge set, and
the usage priority is set by the user based on a knowledge domain associated with the first knowledge set;
determining a type of utterance template of a plurality of types of utterance templates based on the intention analysis result of the first utterance of the user;

acquiring an utterance template based on the determined type of utterance template;
determining contents of a second utterance based on the one or more knowledge elements and the utterance template; and
outputting the second utterance to the user.

* * * * *